US007104548B2

(12) United States Patent
Ichimura et al.

(10) Patent No.: US 7,104,548 B2
(45) Date of Patent: Sep. 12, 2006

(54) WHEELED TYPE WORKING VEHICLE

(75) Inventors: Kazuhiro Ichimura, Niihari-gun (JP); Hiroshi Tsukui, Abiko (JP); Yukihiro Tatsuno, Niihari-gun (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 224 days.

(21) Appl. No.: 10/801,670

(22) Filed: Mar. 17, 2004

(65) Prior Publication Data

US 2004/0173979 A1 Sep. 9, 2004

Related U.S. Application Data

(63) Continuation of application No. 09/890,854, filed as application No. PCT/JP00/00715 on Feb. 9, 2000, now Pat. No. 6,820,877.

(30) Foreign Application Priority Data

| | | |
|---|---|---|
| Feb. 9, 1999 | (JP) | 11-31732 |
| Feb. 9, 1999 | (JP) | 11-31733 |
| Feb. 15, 1999 | (JP) | 11-36047 |
| Feb. 15, 1999 | (JP) | 11-36048 |
| Feb. 15, 1999 | (JP) | 11-36049 |
| Feb. 15, 1999 | (JP) | 11-36050 |
| Feb. 18, 1999 | (JP) | 11-40164 |

(51) Int. Cl.
*B60G 17/00* (2006.01)

(52) U.S. Cl. ................................ 280/6.154; 280/6.157; 280/124.16

(58) Field of Classification Search ............. 280/6.157, 280/6.154, 6.15, 124.159, 124.161, 124.111, 280/124.16
See application file for complete search history.

(56) References Cited

U.S. PATENT DOCUMENTS 4,746,133 A 5/1988 Hanser et al.

FOREIGN PATENT DOCUMENTS

| | | |
|---|---|---|
| JP | 51/77718 U | 12/1974 |
| JP | 57-70103 U | 10/1980 |
| JP | 57-70104 U | 10/1980 |
| JP | 57-123870 U | 8/1982 |
| JP | A-60-113709 | 6/1985 |

(Continued)

OTHER PUBLICATIONS

Japan Valve Manufacturer's Association, "A Handbook of Valve", First Edition, Published by the Nikkan Kogyo Shimbun, Ltd., Mar. 1965.

*Primary Examiner*—Eric Culbreth
(74) *Attorney, Agent, or Firm*—Oliff & Berridge, PLC

(57) ABSTRACT

The wheeled work vehicle according to the present invention has a link that links at least either one of the axles and provided at the front and the rear of the vehicle to a body, suspension hydraulic cylinders provided at the left side and the right side of the chassis to link the axle to the body in conjunction with the link and an accumulator that is made to communicate with oil chambers and of the hydraulic cylinders via restrictors.

17 Claims, 23 Drawing Sheets

FOREIGN PATENT DOCUMENTS

| | | | |
|---|---|---|---|
| JP | 62-110509 | A | 5/1987 |
| JP | 62-27490 | Y2 | 7/1987 |
| JP | 62-174908 | U | 11/1987 |
| JP | U 63-32908 | | 3/1988 |
| JP | 64-6188 | U | 1/1989 |
| JP | Y2-1-39204 | | 11/1989 |
| JP | 2-34414 | A | 2/1990 |
| JP | 2-68203 | U | 5/1990 |
| JP | 4-250230 | A | 9/1992 |
| JP | 4-122760 | U | 11/1992 |
| JP | 5-52390 | U | 7/1993 |
| JP | 5-221212 | A | 8/1993 |
| JP | 5-221214 | A | 8/1993 |
| JP | 6-48149 | A | 2/1994 |
| JP | 6-81373 | A | 3/1994 |
| JP | 6-94066 | A | 4/1994 |
| JP | 6-278438 | A | 10/1994 |
| JP | 7-52630 | A | 2/1995 |
| JP | A-7-32843 | | 2/1995 |
| JP | 7-125523 | A | 5/1995 |
| JP | 7-132723 | A | 5/1995 |
| JP | 7-223419 | A | 8/1995 |
| JP | 7-266833 | A | 10/1995 |
| JP | 8-80722 | A | 3/1996 |
| JP | 8-142629 | A | 6/1996 |
| JP | 9-20122 | A | 1/1997 |
| JP | A-9-30229 | | 2/1997 |
| JP | 9-71388 | A | 3/1997 |
| JP | 9-96330 | A | 4/1997 |
| JP | 9-323522 | A | 12/1997 |
| JP | 10-44735 | A | 2/1998 |
| JP | 11-23207 | A | 1/1999 |
| JP | A-2000-229508 | | 8/2000 |
| JP | A-2000-229509 | | 8/2000 |
| JP | A-2000-233620 | | 8/2000 |
| JP | A-2000-233622 | | 8/2000 |
| JP | A-2000-233623 | | 8/2000 |
| JP | A-2000-233624 | | 8/2000 |
| JP | A-2000-238520 | | 9/2000 |
| SU | 1243964 | | 7/1986 |
| WO | WO 93/04881 | A1 | 3/1993 |

84
84A
84B
84C
85
86
87
88
89
90
91
2
1
1'
61F
61R
70,7,8
82
81
83,13
(A)
(B)
II
REAR
FRONT 81
61F
61F
2
2
IX
3
3
70a
94a
77
4
73C
70
93
92
92
92
2a
2a
73
73b
73b
94
1L
1
91
91
RIGHT
LEFT

TOP
BOTTOM
75
70
77a
77
41
40a
7
6
5
40
43
42
44
44
76

LEFT
RIGHT
VI
VII

FRONT
REAR
LEFT
RIGHT
X, Y
L1
L2
P, Q
87
73
73a
70a
71
72
74a
74
93
94
4a
4b
4c
4d
4f
1a
2
3

FRONT
REAR
X
61F
2
3
3
8a
46
45
45
71
71a
70
73
70a
8

61F
73
A
46
45
8
8a
46
45a
71a
71
B
LEFT
RIGHT
2
3

FRONT
REAR
A
B
3
3
8
8a
45
45a
46
46
71
71a
73
2

2
2b
2c
2a
P1
P2
17A
17B
17b
17a
17g
17d
17e
17g
17c
17f
1B
P5
P4
C2
P3
VD
C1

18a
14a
27
28
24
24a
24s
24b
24c
22
25
25a
25b
25s
25c
26
26a
26b
26c
26s
21
21T
21P
21W
21s
23

W' > W > W"

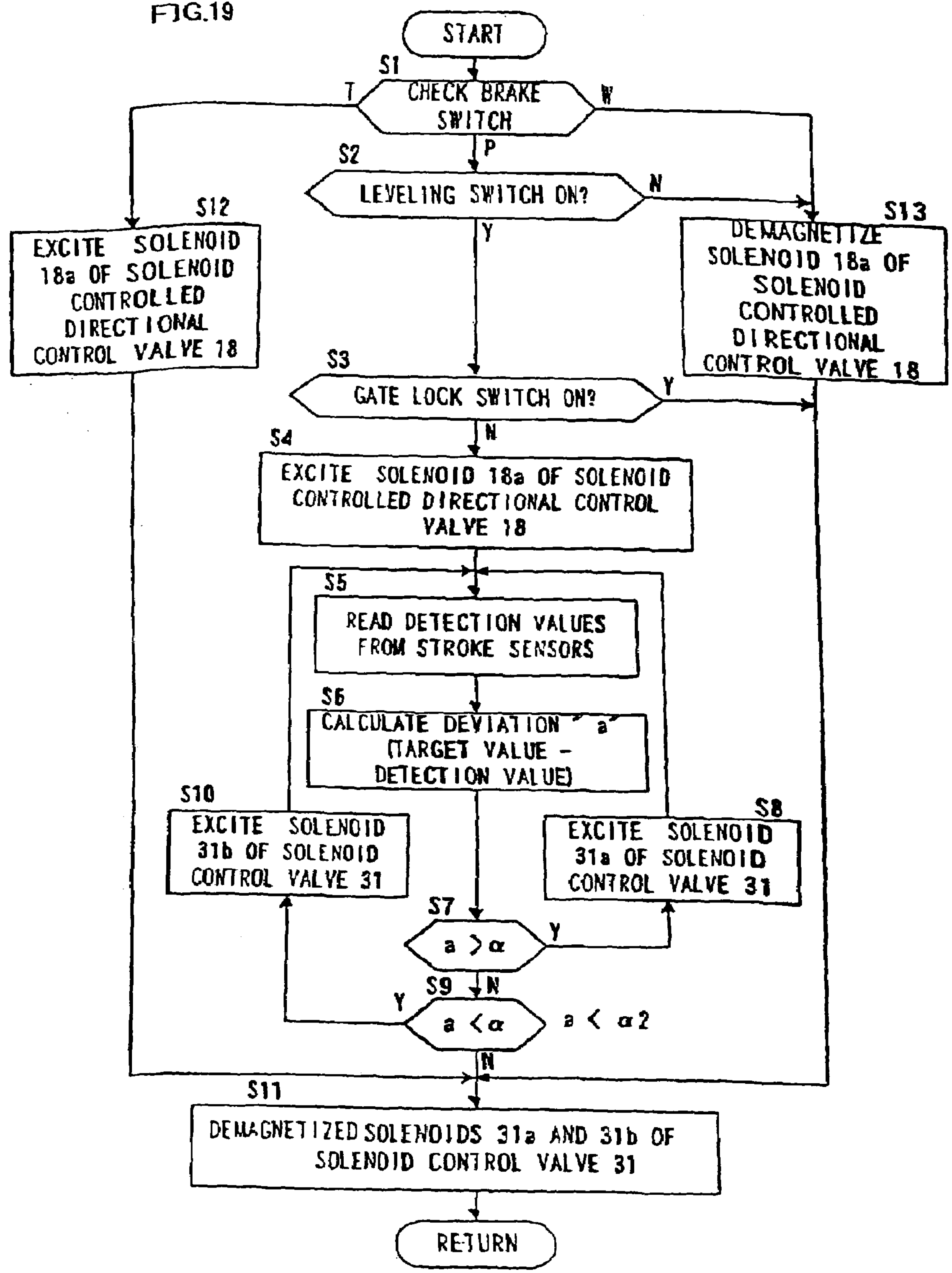
FIG.19
START
S1
CHECK BRAKE SWITCH
T
W
P
S2
LEVELING SWITCH ON?
N
Y
S12
EXCITE SOLENOID 18a OF SOLENOID CONTROLLED DIRECTIONAL CONTROL VALVE 18
S13
DEMAGNETIZE SOLENOID 18a OF SOLENOID CONTROLLED DIRECTIONAL CONTROL VALVE 18
S3
GATE LOCK SWITCH ON?
Y
N
S4
EXCITE SOLENOID 18a OF SOLENOID CONTROLLED DIRECTIONAL CONTROL VALVE 18
S5
READ DETECTION VALUES FROM STROKE SENSORS
S6
CALCULATE DEVIATION "a" (TARGET VALUE - DETECTION VALUE)
S10
EXCITE SOLENOID 31b OF SOLENOID CONTROL VALVE 31
S8
EXCITE SOLENOID 31a OF SOLENOID CONTROL VALVE 31
S7
a > α
Y
S9
N
Y
a < α
a < α2
N
S11
DEMAGNETIZED SOLENOIDS 31a AND 31b OF SOLENOID CONTROL VALVE 31
RETURN VEHICLE SPEED SENSOR
100
F/V CONVERTOR
18a
14a
27
28
24
24a
24s
24b
24c
22
25
25a
25b
25s
25c
26
26a
26b
26s
26c
21
21T
21S
21P
21W
23

WHEELED TYPE WORKING VEHICLE

This is a Continuation of application Ser. No. 09/890,854 filed Aug. 7, 2001, now U.S. Pat. No. 6,820,877 which in turn is a National Stage of PCT/JP00/00715 filed Feb. 9, 2000. The entire disclosure of the prior applications are hereby incorporated by reference herein in its entirety.

INCORPORATION BY REFERENCE

The disclosures of the following priority applications are herein incorporated by reference:
Japanese Patent Application No. H11-031732
Japanese Patent Application No. H11-036047
Japanese Patent Application No. H11-036048
Japanese Patent Application No. H11-036049
Japanese Patent Application No. H11-036050
Japanese Patent Application No. H11-031733
Japanese Patent Application No. H11-040164

BACKGROUND OF THE INVENTION

1. Field of Invention

The present invention relates to a wheeled work vehicle that travels on tires.

2. Description of Related Art

In order to improve the comfort of the operator driving a work vehicle travelling on tires such as a wheeled hydraulic excavator, which has come to run at an increasingly high speed in recent years, Japanese Laid-Open Patent Publication No.S 62-110509, Japanese Laid-Open Patent Publication No. H 6-278438, Japanese Laid-Open Patent Publication No. H 7-125523 and Japanese Laid-Open Patent Publication No. H 7-132723, for instance, each disclose a work vehicle having a suspension mechanism provided between the body and an axle.

In the work vehicle disclosed in Japanese Laid-Open Patent Publication No. S62-110509 (hereafter referred to as prior art 1), two sets of hydraulic cylinders are provided at the two sides, i.e., on the left side and the right side of the body, the upper ends of the cylinder tubes and the lower ends of the cylinder rods are respectively linked to the body and the beam provided over the axle by using pins, and a long hole extending along the vertical direction is formed at the center of the body to link the upper center of the beam and the center of the body with a pin inserted at the long hole. The head chambers of the left hydraulic cylinder and the right hydraulic cylinder are made to communicate with each other via a restrictor. The head chambers of the left and right hydraulic cylinders are also connected to an accumulator via a pressure control valve. The line between the pressure control valve and the accumulator is connected to a hydraulic pump via a check valve which allows hydraulic oil to flow toward the accumulator. As a result, while the body moves vertically due to the contraction of the hydraulic cylinders when the wheels are subject to strong impact during travelling, the load is damped since the pressure control valve opens to communicate the hydraulic cylinders to the accumulator. If either of the left wheel or the right wheel is subject to an impact, the pressure oil from one of the hydraulic cylinders flows into the other hydraulic cylinder to rock the body.

In the work vehicle disclosed in Japanese Laid-Open Patent Publication No. H 6-278438 or Japanese Laid-Open Patent Publication No. H 7-132723 (hereafter referred to as prior art 2), double-acting hydraulic cylinders are mounted at the right side surface and the left side surface of the body with head chambers of the hydraulic cylinders connected with each other via a piping. A restrictor and an accumulator are provided in the middle of the piping and the lower ends of the cylinder rods of the hydraulic cylinders are individually linked to the axle of the work vehicle with pins. Thus, the vibration of the axle occurring during travelling is absorbed and damped to improve the comfort of the operator while travelling the vehicle.

Japanese Laid-Open Patent Publication No. H 7-125523 discloses a work vehicle (hereafter referred to as prior art 3) achieved by linking the upper ends of the cylinder tubes of one set of hydraulic cylinders and the lower ends of the cylinder rods respectively to the center of the body and the center of the axle with pins and linking the center of the axle and either the left side or the right side of the body with a link. In this vehicle, the bottom chamber of the hydraulic cylinder is connected to an accumulator via a restrictor. As a result, while the body moves in the vertical direction due to the contraction of the hydraulic cylinders if the wheels are subject to a strong impact during travelling, the load on the hydraulic cylinder communicating with the accumulator is attenuated.

SUMMARY OF THE INVENTION

The work vehicles disclosed in the publications above present the following problems. Namely, in the work-vehicle in prior art 1 having the body and the axle linked with each other through a pin, a load applied to the body and the axle along the forward/backward direction during an excavating operation or due to brakes applied on the travelling vehicle must be borne by the pin and, therefore, it is necessary to use a large pin having a large pin diameter to assure a sufficient degree of pin strength. In addition, the pin used to restrict the movement of the axle relative to the body slides along the vertical direction as the axle moves up and down, hastening the process in which the sliding area becomes worn. As a result, the play of the pin in the long hole increases, which causes a displacement of the axle relative to the body along the horizontal direction as well as along the vertical direction, thereby making it difficult to smoothly absorb an impact. Furthermore, since single-acting hydraulic cylinders are utilized, which are engaged only when they contract, an impact cannot be hydraulically absorbed while they are extended, allowing the impact to be applied to the component members.

Since the body and the axle are linked to each other by the left hydraulic cylinder and the right hydraulic cylinder in the work vehicle in prior art 2, an excessive load is applied to the hydraulic cylinders in the forward/backward direction and the lateral direction as well as along the vertical direction while the vehicle is engaged in an excavating operation or if the vehicle is rocked.

In the work vehicle in prior art 3, since the body and the axle are linked to each other through the central hydraulic cylinder and the link, there is no means for limiting the rocking movement of the body, and thus, a shock related to the rocking movement cannot be absorbed. Thus, the work vehicle disclosed in the publication, in which the frame is not allowed to move vertically or to rock in a smooth manner while absorbing any impact from the axle, is not suited for practical use.

The work vehicles in prior art 2 and prior art 3 also present a problem in that while a fixed restrictor is provided in the passage between the hydraulic cylinder and the accumulator, the bottom chamber and the rod chamber of the hydraulic cylinder are not made to communicate with each other, which allows the attenuating force of the suspension to entirely depend upon the size of the sectional area of the variable constriction, thereby presenting difficulty in satisfying the personal preferences of individual operators.

Furthermore, since the movement of the left hydraulic cylinder and the right hydraulic cylinder are adjusted by a single accumulator in the work vehicles in prior art 1 through prior art 3, the capacity of the accumulator is bound to be large, which necessitates the scale of the accumulator to be large as well. It is difficult to fit such a large accumulator within the limited space inside the body through efficient space utilization, which places limits on the degree of flexibility with regard to wheeled hydraulic excavator design. In particular, if a bladder-type hydro-pneumatic accumulator is to be utilized, its structure necessitates that it be installed vertically, placing further restrictions on the installation arrangement. As a result, the accumulator may need to be installed with a part thereof projecting out from the body and, in such a case, a falling object or the like may collide with the projecting portion to damage the accumulator.

The work vehicle in prior art 2 is provided with a spool-type three ports/three positions solenoid control valve for leveling the height of the vehicle. By switching this solenoid control valve, the pressures in the hydraulic cylinders are controlled so as to set the distance between the axle and the body while the vehicle travels or it is engaged in operation to a predetermined specific value, to level the height of the vehicle.

However, since the suspension performance is effected while controlling the pressure at the hydraulic cylinder while the vehicle travels, it is difficult to correctly set the various parts (such as the restrictor) that affect the suspension performance in the work vehicle in prior art 2. In addition, since the pressures at the hydraulic cylinders are controlled during operation as well, the suspension is soft, which may cause the operator some discomfort.

Furthermore, a spool-type solenoid control valve is utilized in the work vehicle in prior art 2, and the solenoid control valve is switched to the neutral position to cut off the hydraulic cylinders from the hydraulic source or the tank when it is riot necessary to level the height of the vehicle such as when the vehicle travels. However, since spool-type control valves tend to readily allow leaks at the neutral position, there is a concern that the vehicle height may change while the vehicle travels or while it is in a stationary state.

The vehicle height is leveled primarily to sustain a specific standard vehicle attitude when the weight balance between the front and the rear of the vehicle changes (e.g., the body leans forward) due to a front attachment replacement. Accordingly, the vehicle should be leveled through an operation performed outside the cabin while visually checking any change occurring in the vehicle attitude. As a result, the height of vehicle cannot be fine-tuned through an operation performed within the cabin with ease.

However, if an operating lever to be used to operate a leveling control valve is provided outside the cabin in order to achieve leveling through an operation of the operating lever, the operating lever may be inadvertently turned due to an impact from the road surface even when the vehicle is not being leveled such as while it is travelling, to accidentally switch the control valve to a position other than the neutral position. This will result in an undesirable fluctuation in the vehicle height.

Moreover, if the operating lever to be used to operate the leveling control valve is provided outside the cabin, the operability is compromised and the operating lever may even be damaged by an object falling from the front. In addition, when the suspension circuit is formed by switching the leveling control valve to the neutral position, it is necessary to take into consideration the positional relationship between the control valve and the accumulator in order to obtain the maximum suspension performance (in particular, the maximum accumulator performance) since the distance from the control valve to the accumulator affects the suspension performance.

An object of the present invention is to provide a wheeled work vehicle capable of effectively absorbing an impact occurring while the vehicle is travelling.

In order to achieve the object described above, the wheeled work vehicle according to the present invention comprises a link that links at least one of axles provided at the front and the rear of the vehicle to the chassis, suspension hydraulic cylinders provided on the left and right sides of the chassis, which connect the axle to the chassis in conjunction with the link and an accumulator that is allowed to communicate with the oil chambers of the hydraulic cylinders via restrictors.

This structure allows the axle to smoothly move along the vertical direction and also to smoothly rock relative to the frame to enable efficient absorption of a shock occurring when the hydraulic cylinders expand/contract, to facilitate the adoption of the work vehicle in practical use.

The work vehicle according to the present invention may further comprise a means for adjustment that changes the suspension performance in correspondence to the area of the passages communicating between the bottom chambers and the rod chambers of the hydraulic cylinders. By providing such a means for adjustment, the suspension performance, in particular the damping performance can be changed with ease.

The work vehicle may further comprise a means for adjustment that changes the suspension performance in correspondence to the area of the passages communicating between the hydraulic cylinders and the accumulator. By providing such a means for adjustment, the suspension performance and, in particular, the damping performance can be adjusted with ease.

It is desirable to use a diaphragm-type accumulator that separates the internal gas and the oil through a diaphragm and to install the accumulator in the space formed by the frame without any parts of the accumulator projecting out from the upper end surface and the lower end surface of the chassis. The accumulator thus installed within the limited space with a high degree of efficiency is protected from falling objects and the like.

The wheeled work vehicle according to the present invention may comprise a hydraulic source from which pressure oil originates, a supply/discharge device that expands/contracts the hydraulic cylinders by supplying the pressure oil to the hydraulic cylinders and discharging the pressure oil from the hydraulic cylinders, a traveling-state detection device that detects whether the vehicle is in a travelling state or in a non-travelling state and a leveling/suspension switching device that allows the supply/discharge device to expand/contract the hydraulic cylinders when the traveling-state detection device detects that the vehicle is in a non-travelling state and prohibits the expansion/contraction of the hydraulic cylinders by the supply/discharge device if the traveling-state detection device detects that the vehicle is in a travelling state to engage a suspension function.

This eliminates the necessity for taking into consideration the requirements that must be met to realize a leveling function when designing the suspension performance to be achieved while the vehicle travels, to facilitate settings to be made at the various components involved in achieving the suspension performance.

Alternatively, it is desirable that the wheeled work vehicle according to the present invention further comprise a hydraulic source from which pressure oil originates and a leveling valve that switches the oil supply/discharge path to/from the hydraulic cylinders during a leveling operation in response to an operation of an operating lever, with the operating lever projecting out from a side surface of the chassis further toward the front of the vehicle relative to the axle.

This improves the operability during a leveling operation since the operator does not need to insert his hand into the recessed part so as to operate the operating lever, and also it allows the operator to visually check for any positional changes occurring with regard to the positions of the hydraulic cylinders and the link connecting the body to the axle to enable a highly reliable leveling operation to be performed with ease.

As a further alternative, the wheeled work vehicle according to the present invention may further comprise a hydraulic source from which pressure oil originates, a leveling valve that switches the oil supply/discharge path to/from the hydraulic cylinders during a leveling operation and a stop valve that disconnects the supply/discharge path from the hydraulic cylinders.

By adopting the structure described above, the quantity of oil that is leaked from the hydraulic cylinder is minimized, to prevent the upper swiveling body from being lowered to an undesirable extent.

It may be further provided with a retaining member that is utilized to operate the stop valve at the travelling body and to retain the stop valve at the cutoff position. Such a retaining member retains the stop valve at the cutoff position even if an external impact is applied when the stop valve is switched to the cutoff position to minimize the leak from the hydraulic cylinders reliably.

BRIEF DESCRIPTION OF THE DRAWINGS

FIG. 19 is a flow chart of an example of the processing executed by the controller of the wheeled work vehicle in the second embodiment of the present invention;

DETAILED DESCRIPTION OF PREFERRED EMBODIMENTS the following is an explanation of preferred embodiments of the present invention, given in reference to the drawings.

First Embodiment

Figure 1:
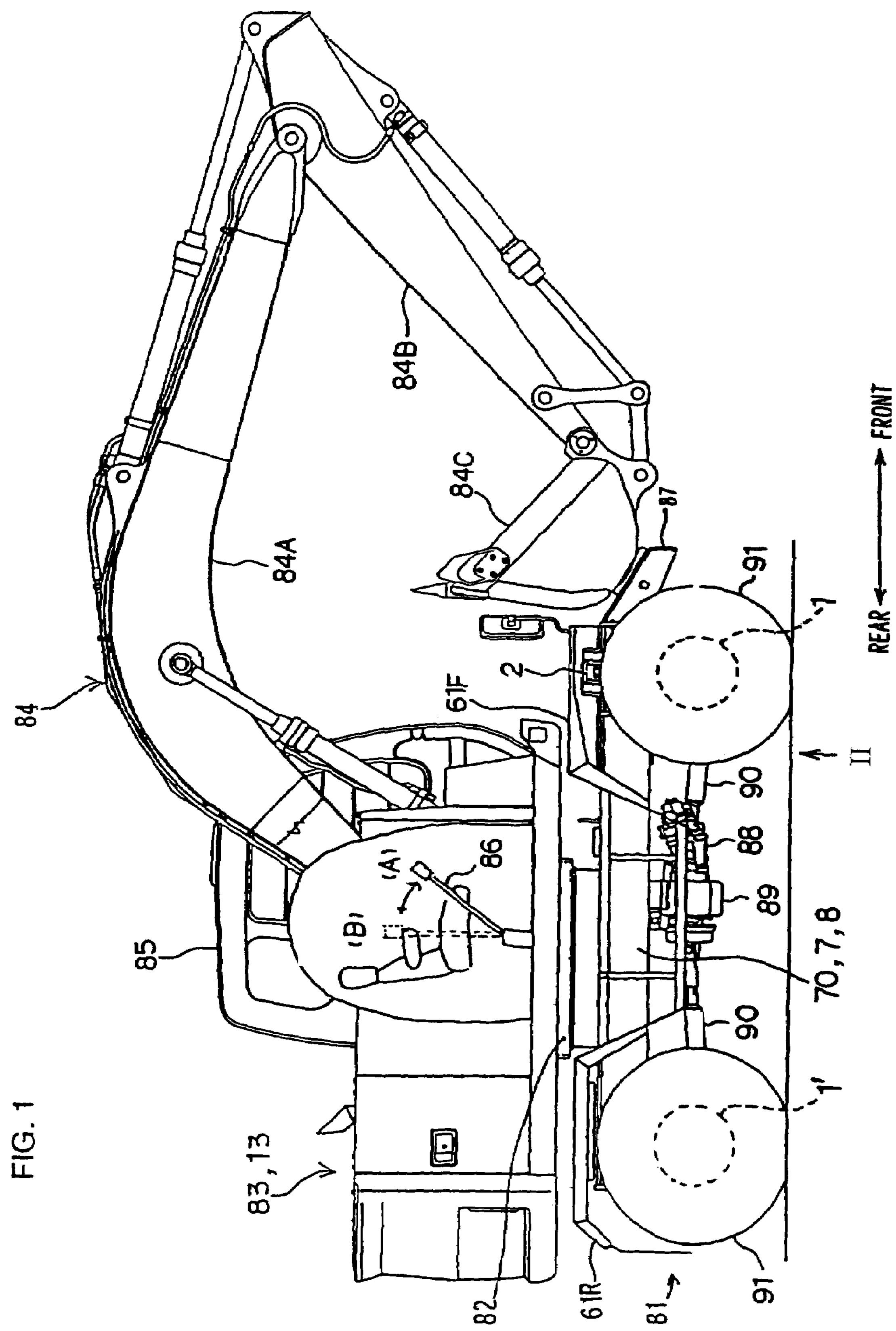
FIG. 1 is a side elevation of a wheeled hydraulic excavator adopting the present invention.

FIG. 1 is a side elevation (a partial sectional view) of a wheeled hydraulic excavator in which the present invention is adopted. As illustrated in FIG. 1, the wheeled hydraulic excavator includes a lower travelling body 81 and an upper swiveling body 83 which is rotatably linked to the top of the lower travelling body 81 via a swiveling device 82. At the upper swiveling body 83, a front attachment 84 (hereafter referred to as an attachment) constituted of a boom 84A, an arm 84B and a bucket 84C and an operator's cab 85 are provided, with a gate lock lever 86 which is operated to a release position (position A) when the operator boards the vehicle and is operated to a locked position (position B) when the operator leaves the vehicle provided at the entrance of the operator's cab 85. A chassis frame 70 (hereafter referred to as a frame), a travelling hydraulic motor 88, a transmission 89, a propeller shaft 90 and tires 91 are provided at the lower travelling body 81, and the drive force imparted from the propeller shaft 90 is communicated to the tires 91 via axles 1 and 1'. Fenders 61F and 61R are provided to cover the tops of the tires 91 at the front and the rear of the frame 70, and hydraulic cylinders 2 which are to be detailed later are provided inside the front fender 61F. It is to be noted that the frame 70 includes a bucket stage 87 provided at its front-most end. In this embodiment, the rear axle 1' is directly secured to the frame 70, whereas the front axle 1 is linked to the frame 70 via the suspension mechanism described below.

Figure 2:
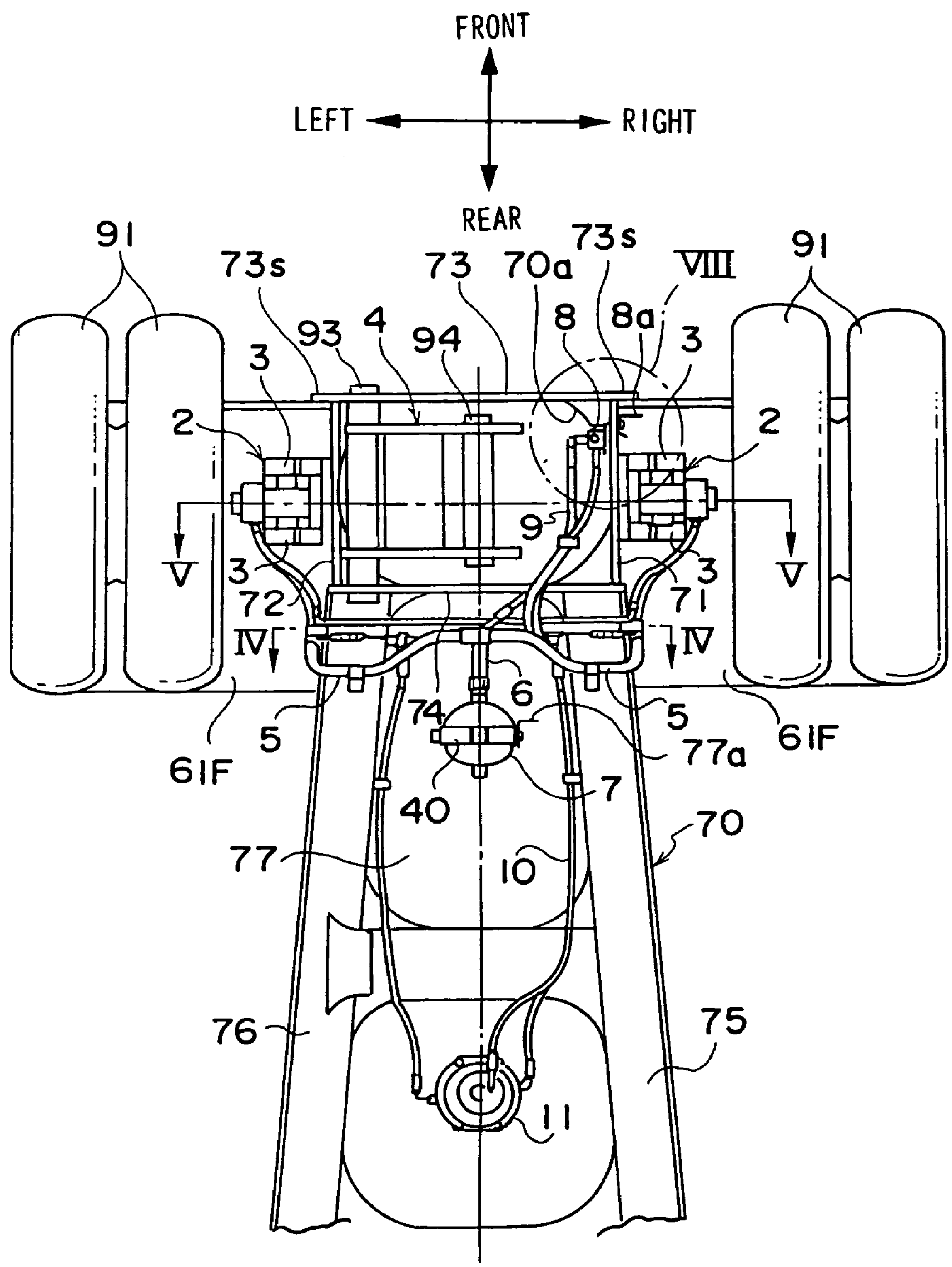
FIG. 2 is a bottom view of the wheeled hydraulic excavator adopting the present invention (from the direction indicated by the arrow at II in FIG. 1)
Figure 3:
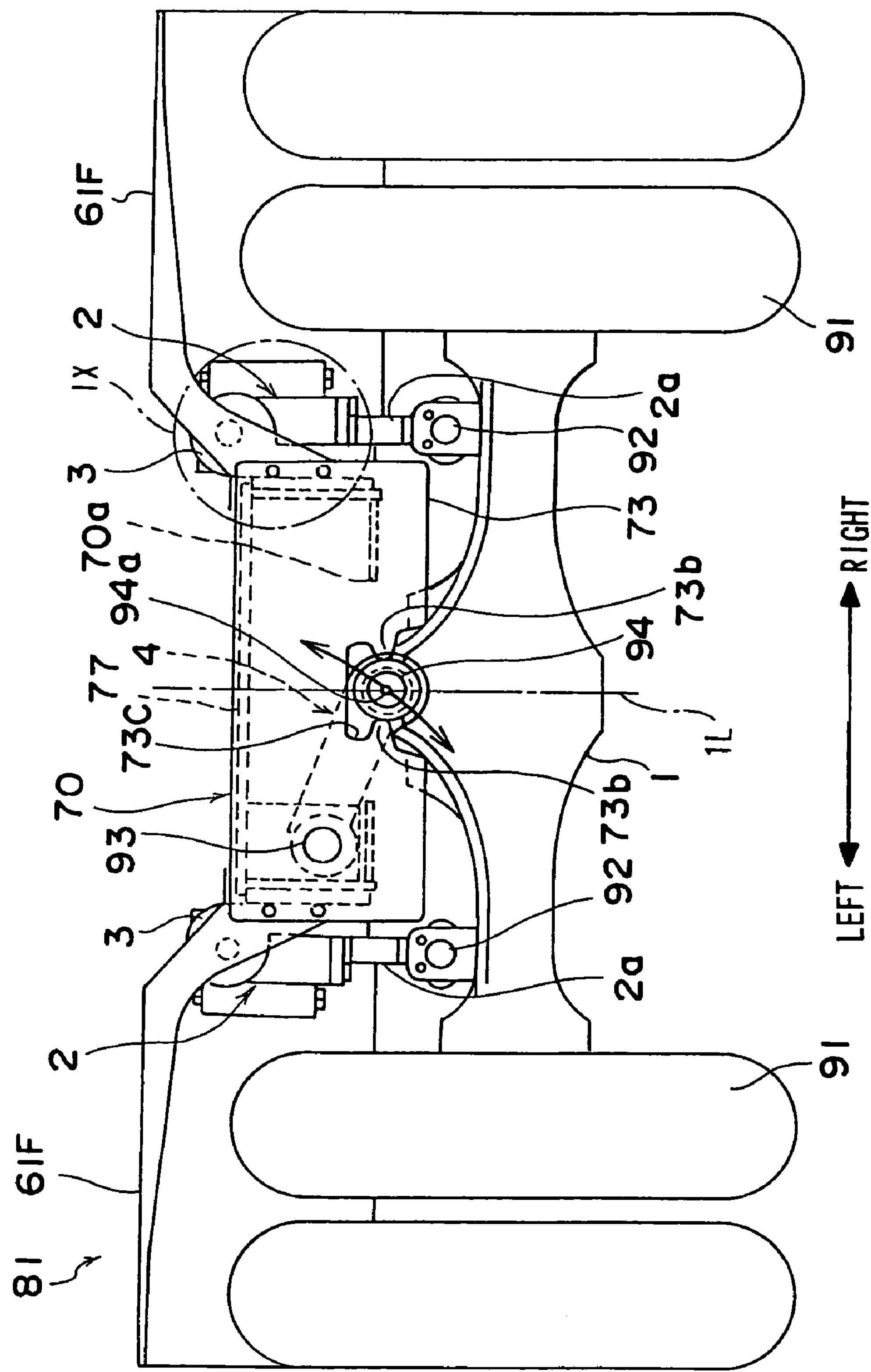
FIG. 3 is a front view of the wheeled hydraulic excavator adopting the present invention.
Figure 4:
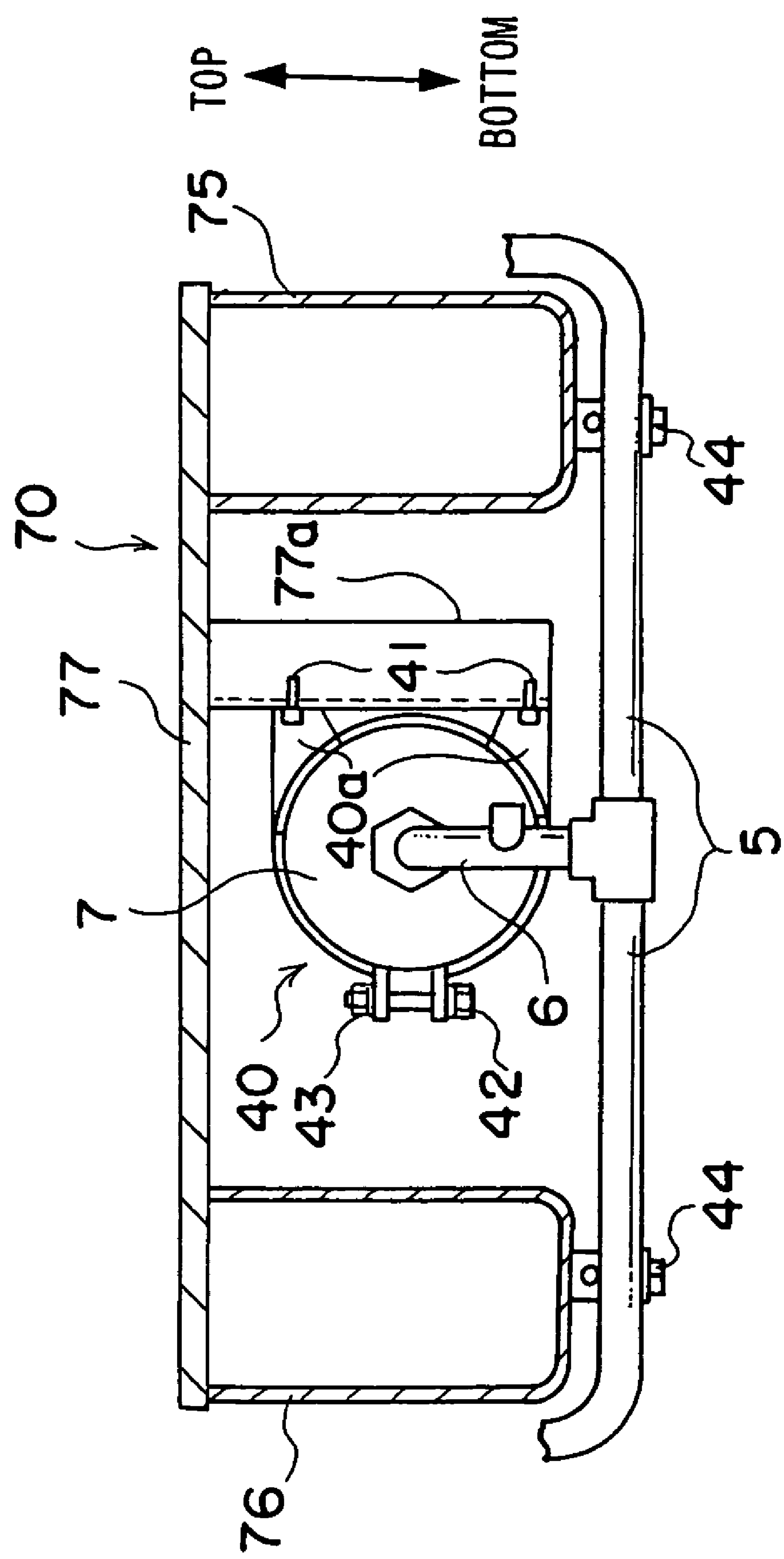
FIG. 4 is a sectional view taken along line IV—IV in FIG. 2.
Figure 5:
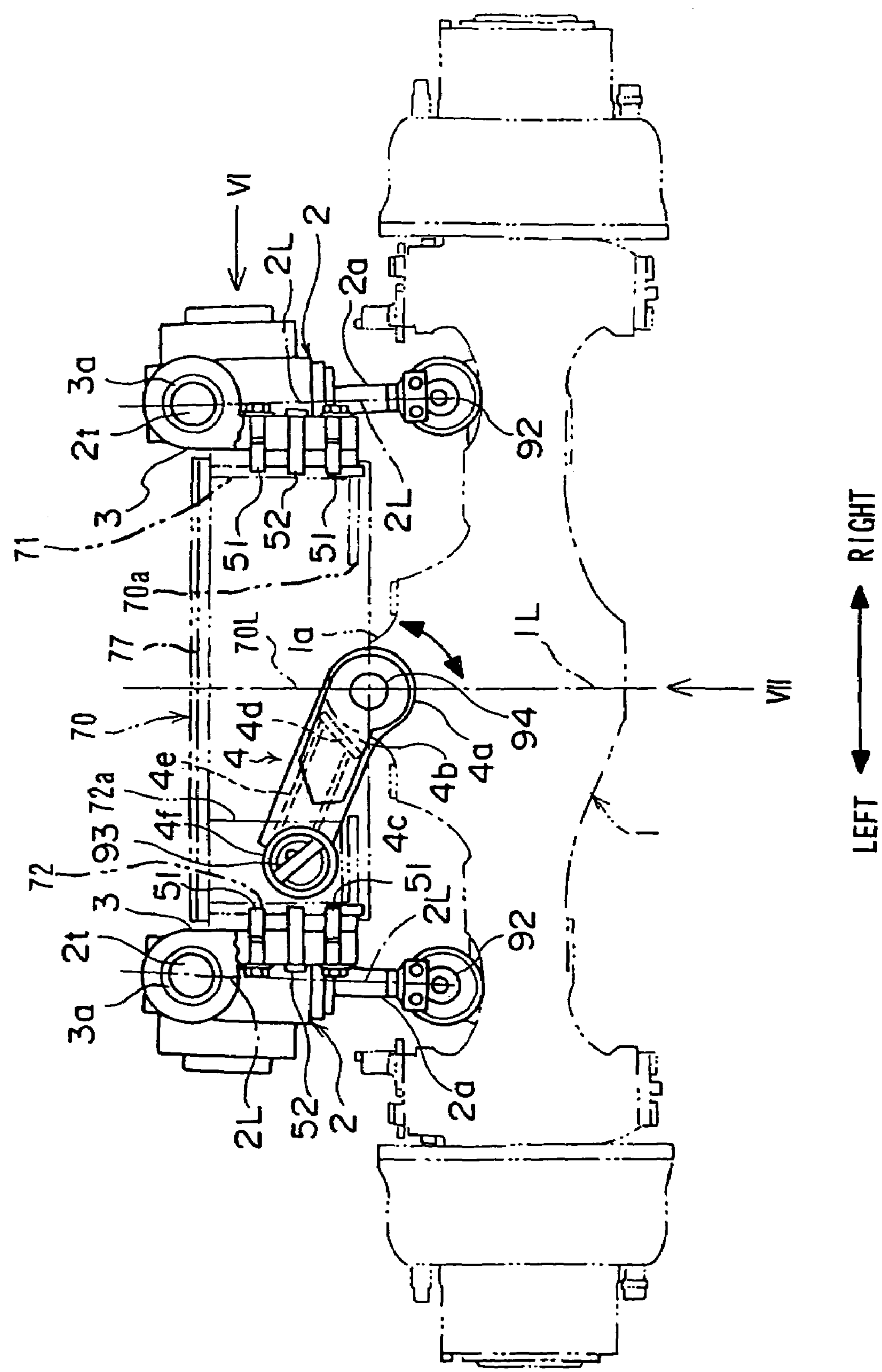
FIG. 5 is a sectional view taken along line V—V in FIG. 2.

FIG. 2 is a bottom view of the wheeled hydraulic excavator adopting the present invention (viewed from the direction indicated by the arrow II in FIG. 1). FIG. 3 shows the lower travelling body 81 viewed from the front of the vehicle (a front view of FIG. 1). FIG. 4 is a sectional view taken along line IV—IV in FIG. 2 primarily illustrating how of the accumulator 7 is mounted. FIG. 5 is a sectional view taken along line V—V in FIG. 2 primarily illustrating how the hydraulic cylinders 2 are mounted. It is to be noted that in FIGS. 2~5, the body is in a stationary state (initial state). In addition, the illustration of the axle 1, which is located directly under the hydraulic cylinders 2, is omitted in FIG. 2, and the frame 70 and the axle 1 are indicated by the two-point chain lines in FIG. 5. As shown in FIGS. 2~5, the frame 70 includes right and left side plates 71 and 72 provided at the front of the vehicle, a front plate 73 and a rear plate 74 respectively in contact with the front end surfaces and the rear end surfaces of the side plates 71 and 72, right and left side plates 75 and 76 (each having a roughly U-shaped cross section, as shown in FIG. 4) that are in contact with the rear plate 74 and are provided at the rear of the vehicle and an upper plate 77 which is in contact with the upper surfaces of the individual plates 71~76. The right and left ends of the front plate 73 extend further but compared to the side plates 71 and 72, and the fender 61F is mounted at extending portions 73*s* (see FIGS. 2 and 3).

Figure 6:
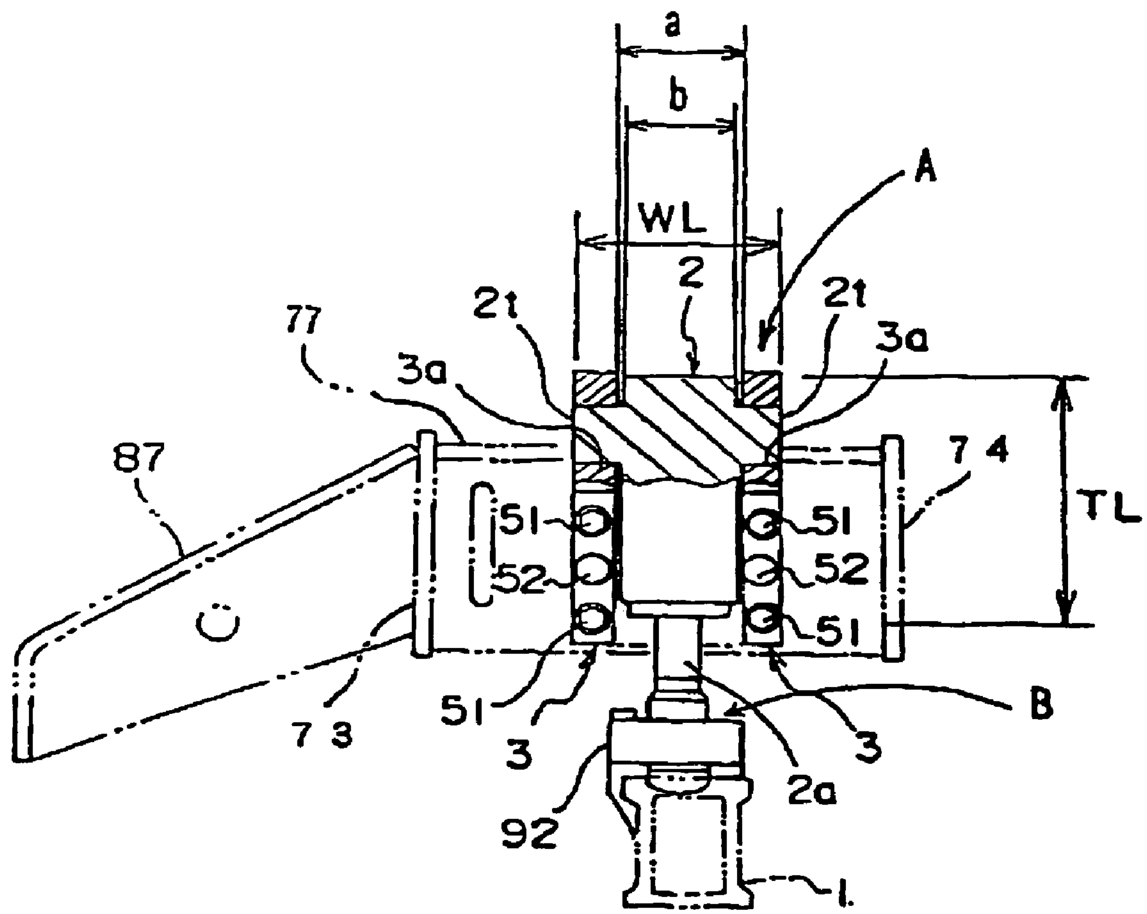
FIG. 6 presents a view from the direction indicated by the arrow at VI n FIG. 5.
Figure 7:
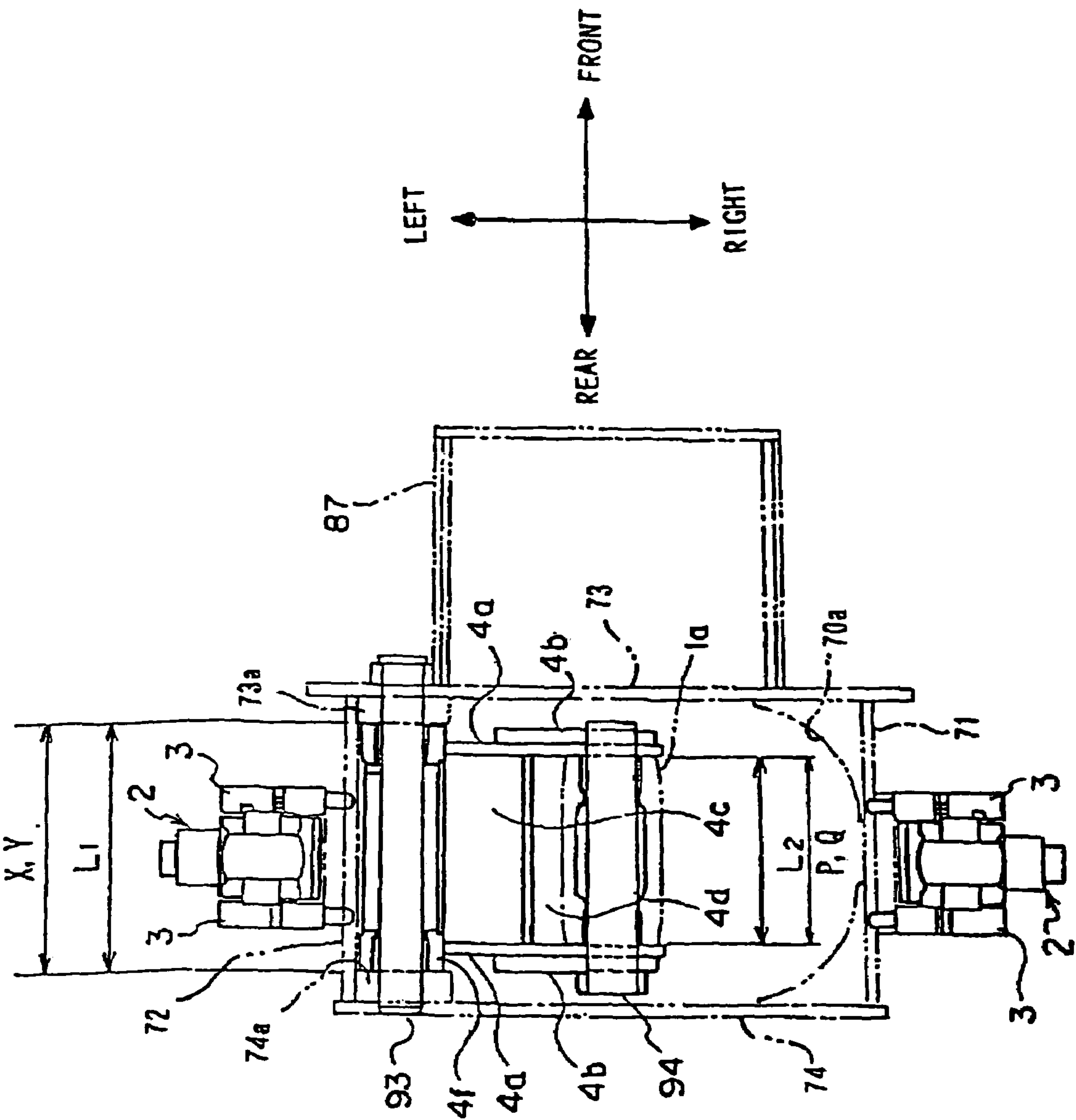
FIG. 7 presents a view from the direction indicated by the arrow at VII in FIG. 5.

FIG. 6 presents a view taken along the direction indicated by the arrow VI in FIG. 5, and FIG. 7 presents a view (an enlargement of the essential portion in FIG. 2), taken along the direction indicated by the arrow VII in FIG. 5. It is to be noted that the frame 70 and the axle 1 are indicated by the two-point chain lines in FIGS. 6 and 7. As illustrated in FIGS. 5~7, a pair of brackets 3 is fastened with bolts 51 to each of the side plates on the front side, i.e. the right and left side plates 71 and 72 with the brackets 3 in a pair provided over distance from each other along the forward/backward direction. A circular opening 3*a* is formed at the upper portion of each bracket 3. Projections 2*t* provided at the front and rear of the upper side surface of the cylinder tube of the hydraulic cylinder 2 are fitted inside the openings 3*a*, so as to rotatably support the cylinder tube. The positions at which the brackets 3 are mounted at the side plates 71 and 72 are set with knock pins 52 to prevent the projections 2*t* of the hydraulic cylinders 2 from one-sidedly coming in contact with the inner surfaces of the openings 3*a* at the brackets 3. It is to be noted that the method whereby the hydraulic cylinders 2 are clamped with a pair of brackets 3 in this manner is referred to as a trunnion method. The ends of piston rods 2*a* are rotatably linked to the axle 1 via pins 92. In this structure, the pair of hydraulic cylinders 2 provided at the left and the right sides are mounted by ensuring that axes 2L of the hydraulic cylinders 2 form a substantially "A-line shape", i.e., so that the ends of the piston rods 2*a* turn outward along the width of the vehicle, in the initial state.

As illustrated in FIGS. 5 and 7, the front plates 73 and the rear plate 74 are connected to the center of the axle 1 (on the center line 1L) at either the left side or the right side (at the left side in the figures) by a link 4 which is provided through an opening at the bottom of the frame 70. The link 4, which is constituted of main plates 4*a* provided at the front and the rear over a distance from each other, reinforcement plates 4*b* each welded to the outer surface of a main plate 4*a* toward the axle, three side plates 4*c*~4*e* each having the two ends thereof welded to the inner surfaces of the main plates 4*a* and pipe 4*f* welded to the outer surfaces of the main plates 4*a* toward the body frame 70, forms a box-shaped closed space with its side plates 4*c*~4*e* and pipe 4*f*. Inner plates 73*a* and 74*a* are provided over a distance equal to the axial length of the pipe 4*f* from each other, respectively at the front plate 73 and the rear plate 74 of the frame 70, and by fitting the pipe 4*f* between the inner plates and inserting a pin 93 in the pipe 4*f*, the frame 70 and the link 4 are rotatably linked with each other via the pin 93. In addition, a mounting member 1*a* used to mount the link 4 is. provided on the axle 1, and by setting the main plates 4*a* so as to clamp the mounting member 1*a* between them and inserting a pin 94, the axle 1 and the link 4 are rotatably linked with each other via the pin 94.

By individually connecting the frame 70 to the link 4 and the axle 1 to the link 4 with the pins as described above, the link 4 is allowed to rotate by using the pin 93 as a support point as indicated by the arrow in FIG. 3 and the axle 1 is allowed to move mainly vertically relative to the frame 70 within the expansion/contraction range of the piston rods 2*a*, as shown in FIG. 3. In addition, the axle 1 may engage in a rocking movement with the pin 94 constituting the support point within the range of the expansion/contraction of the piston rods 2*a* under certain circumstances. The mounting tolerance for the link 4 should be set as rigorously as possible in order to ensure that the fitting tolerance with regard to the axial length X of the pipe 4*f* and the distance Y between the pair of inner plates 73*a* and 74*a* of the frame 70 (the clearance (Y-X)at the fitting area L1 in FIG. 7) and the fitting tolerance with regard to the distance P between the pair of main plates 4*a* and the axial length Q of the mounting member 1*a* of the axle 1 (the clearance (P-Q) at the fitting area L2 in FIG. 7). are smaller than the play (a-b)manifesting at the area A and the play manifesting at the area B shown in FIG. 6 where the hydraulic cylinders 2 are mounted. By enforcing such a rigorous setting, it becomes possible to allow the load from the frame 70 applied along the frontward/backward direction of the body to be communicated to the axle 1 via the link 4 instead of via the hydraulic cylinders 2.

As illustrated in FIG. 3, a notched portion 73*c* having projections 73*b* on the inside thereof is provided at the bottom center of the front plate 73 to allow the top of the pin 94 to be seen from the front of the vehicle. A nipple 94*a* for grease injection is provided at the center of the head of the pin 94, and the height of the vehicle is adjusted as described later while visually checking the positional relationship between the nipple 94*a* and the projections 73*b* at the front plate 73 (the relationship between their heights).

Next, the arrangement of the hydraulic pipings is explained. As shown in FIG. 2, the right and left hydraulic cylinders 2 are connected with each other via a line 5, with the accumulator 7 connected in the middle (at the center) of the line 5 via a line 6. The accumulator 7 is also connected with a directional control valve 8 whose position is switched through a manual operation of a switching lever 8*a* via a piping 9, and the directional control valve 8 is connected to a center joint 11 via a piping 10. A detailed explanation of the hydraulic circuit is to be given later in reference to FIG. 11. It is to be noted that a hydraulic pump 13 and a tank which are to be explained later are mounted at the upper swiveling body 83 (see FIG. 1), and during a leveling operation, the pressure oil from the hydraulic pump 13 is supplied to the hydraulic cylinders 2, the accumulator 7 and the like provided at the lower travelling body 81 via the center joint, 11 and the oil from the hydraulic cylinders 2 is discharged into the tank via the directional control valve 8 and the center joint 11.

The accumulator 7 is a so-called diaphragm-type accumulator 7 that separates the internal gas from the oil through a diaphragm, and has the substantially following features in comparison to a so-called bladder-type hydro-pneumatic accumulator which separates the internal gas from the oil through a bladder. Namely, the overall shape of the diaphragm-type accumulator is round with a smaller height along the lengthwise direction compared to that of the bladder-type hydro-pneumatic accumulator. In addition, the structure of the diaphragm-type accumulator does not impose any restrictions on the attitude, which allows the accumulator to be positioned by setting its length along the vertical direction (hereafter referred to as a vertical installation) or to be positioned by setting its length along the horizontal direction (hereafter referred to as a horizontal installation). Due to its structural restrictions, the bladder-type hydro-pneumatic accumulator cannot be installed horizontally with ease. As shown in FIG. 4, the diaphragm-type accumulator 7 is installed along the horizontal direction in the embodiment.

As illustrated in FIG. 4, the right and left side plates 75 and 76 at the rear of the frame 70 have a roughly U-shaped cross section, thereby creating laterally elongated. spaces between the upper plate 77 and the side plates 75 and 76. A bracket 77*a* having an L-shaped cross section is welded onto the lower surface of the upper plate 77 (see FIG. 2), and a leg member 40*a* formed as an integrated part of a band 40 is fastened onto the bracket 77*a* with bolts 41. The band 40 is formed to achieve a roughly C shape and the accumulator 7 is mounted inside the band 40. A bolt 42 is inserted at the two ends of the band 40, and a nut 43 is screwed on the bolt 42 so that the band 40 is caused to contract by tightening the bolt 42 to secure the accumulator 7. It is to be noted that the line 5 mentioned earlier is suspended from the left and right side plates 75 and 76 via piping retaining members 44.

The accumulator 7 is installed in the space formed between the left and right side plates 75 and 76 by ensuring that its upper end does not project-out further above the upper plate 77 and that its lower end does not project out further below the lower end surfaces of the side plates 75 and 76. In other words, the entire accumulator 7 is contained within the space defined by the upper end surface and the lower end surface of the frame 70. By installing the accumulator 7 in this manner, the accumulator 7 is completely housed inside the frame 70, to be protected from falling objects and the like and also to improve the visual aspect of the design. In addition, since the accumulator 7 is horizontally installed, the line 6 connected to the accumulator 7 does not project out downward. It is to be noted that while the line 5 connecting the left and right hydraulic cylinders 2 with each other is allowed to project out below the lowermost surfaces of the side plates 75 and 76 to extend laterally so as to be suspended from the side plates 75 and 76, the extent to which the line 5 projects out further below the side plates 75 and 76 can be minimized since there is no distended portion attributable to the line 6. If a bladder-type hydro-pneumatic accumulator is to be installed instead of the diaphragm-type accumulator 7 utilized in the embodiment, it becomes difficult to house the accumulator within the space formed by the left and right side plates, 75 and 76 and the upper plate 77 because of its greater height.

Figure 8:
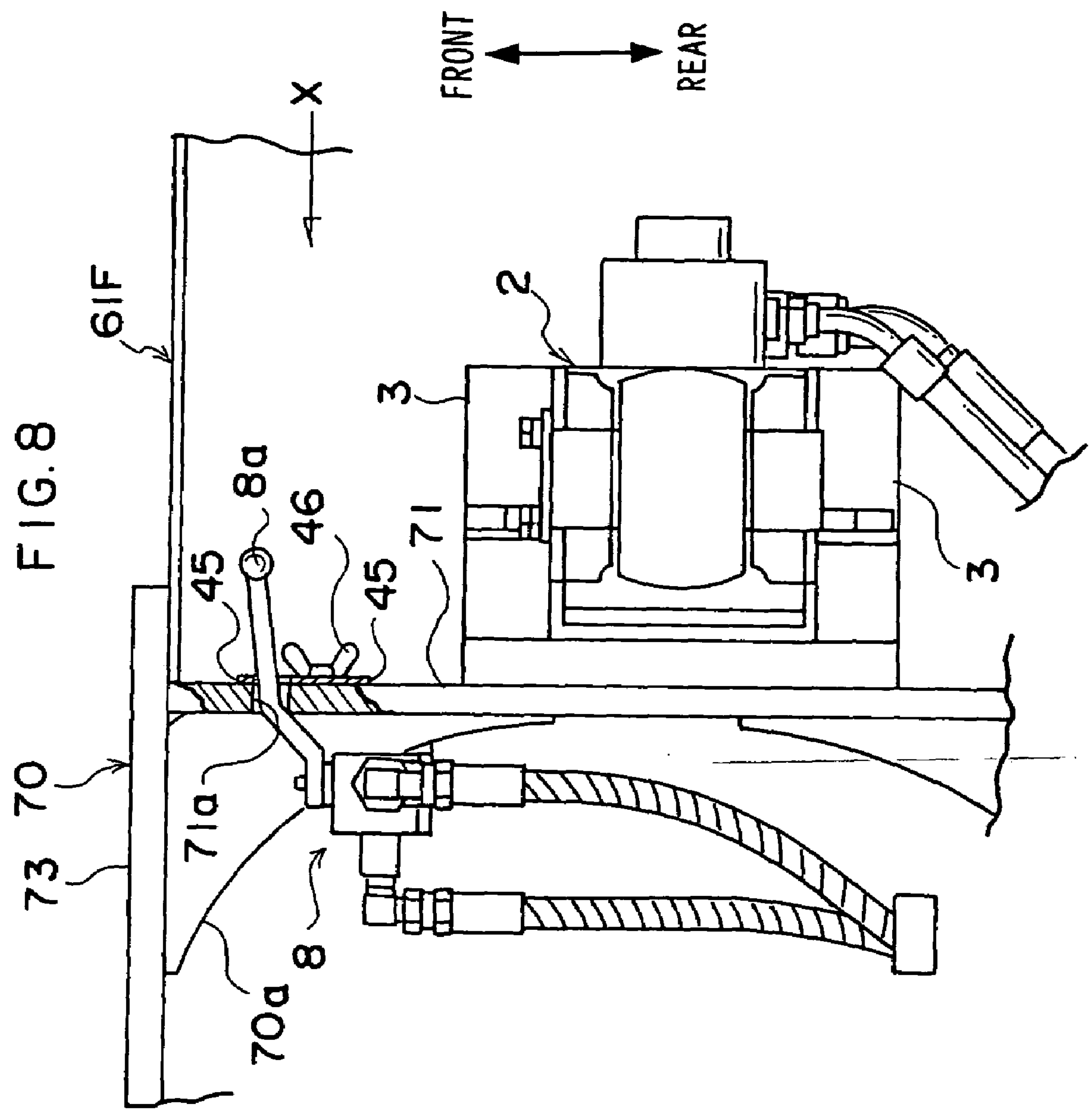
FIG. 8 is an enlargement of area VIII in FIG. 2.
Figure 9:
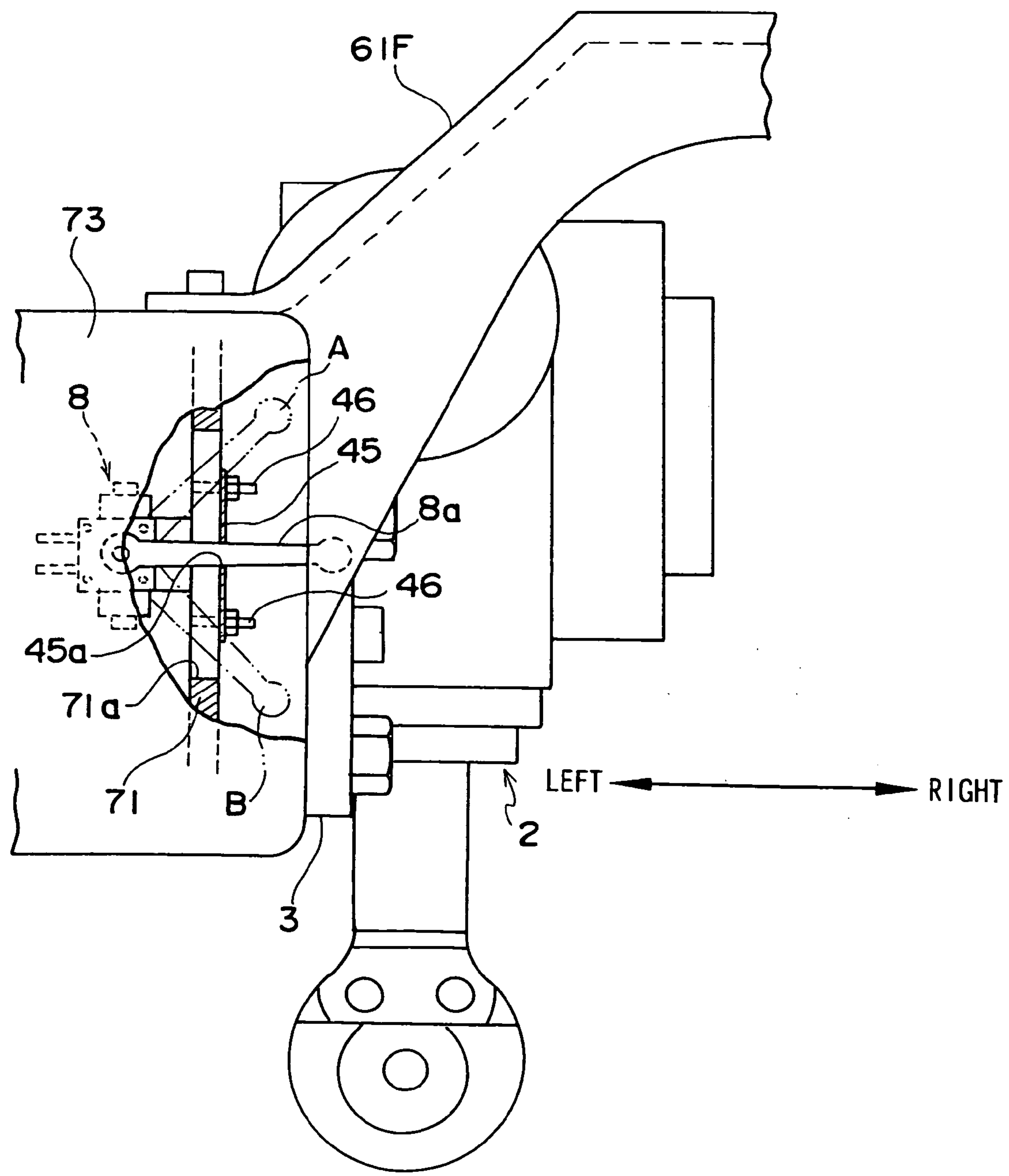
FIG. 9 is an enlargement of area IX in FIG. 3.

Now, the mounting position of the switching lever 8*a* operated to switch the directional control valve 8 is explained. FIG. 8 is an enlarged view of area VIII (a partial sectional view) in FIG. 2 and FIG. 9 is an enlarged view of area IX (a partial sectional view) in FIG. 3. As shown in FIGS. 8 and 9, a slot 71*a* is provided at a part of the side plate 71 which is set further frontward of the vehicle relative to the hydraulic cylinders 2, and the switching lever 8*a* passes through the slot 71*a* to project to the outside of the side plate 71. When viewed from the front of the vehicle, the entire switching lever 8*a* is hidden by the fender 61F, with the fender 61F covering the switching lever 8*a* from the above relative to the vehicle. The switching lever 8*a* can be operated along the slot 71*a*, and if the switching lever 8*a* is set to a position A from the neutral position shown in FIG. 9, the directional control valve 8 is switched as detailed later to raise the height of the vehicle, whereas if it is set to a position B, the directional control valve 8 is switched as described later to lower the height of the vehicle.

Figure 10:
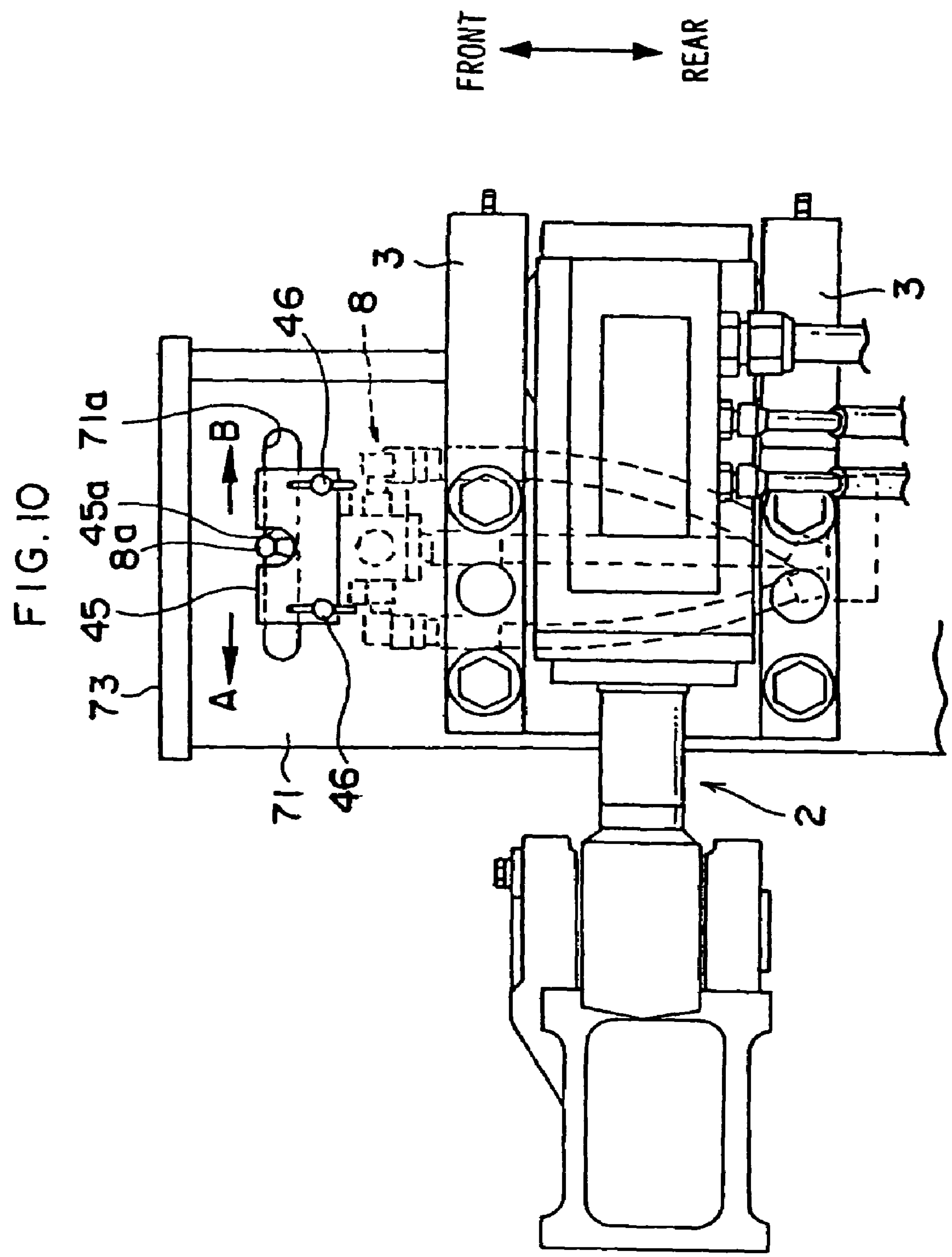
FIG. 10 is a view from the direction indicated by the arrow at X in FIG. 8.

FIG. 10 presents a view of FIG. 8 taken from the right (a view taken from the direction indicated by the arrow X in FIG. 8). A retaining cover 45 is provided as in order to prevent the switching lever 8*a* from being inadvertently switched when, for instance, the switching lever 8*a* is subjected to an impact of a falling object coming from the right, vibration or the like, as shown in FIGS. 8~10. The retaining cover 45 is constituted of a roughly rectangular thin plate that covers the slot 71*a* and is secured to the side plate 71 with two wing nuts 46. A notched portion 45*a* is formed at a part (at a position corresponding to the neutral position of the switching lever 8*a*) of the retaining cover 45, and this notched portion 45*a* restricts the movement of the switching lever 8*a* when the vehicle is not being leveled. During the leveling operation, the wing nuts 46 are loosened to remove the retaining cover 45 and thus, the movement of the switching lever 8*a* becomes unrestricted.

Figure 11:
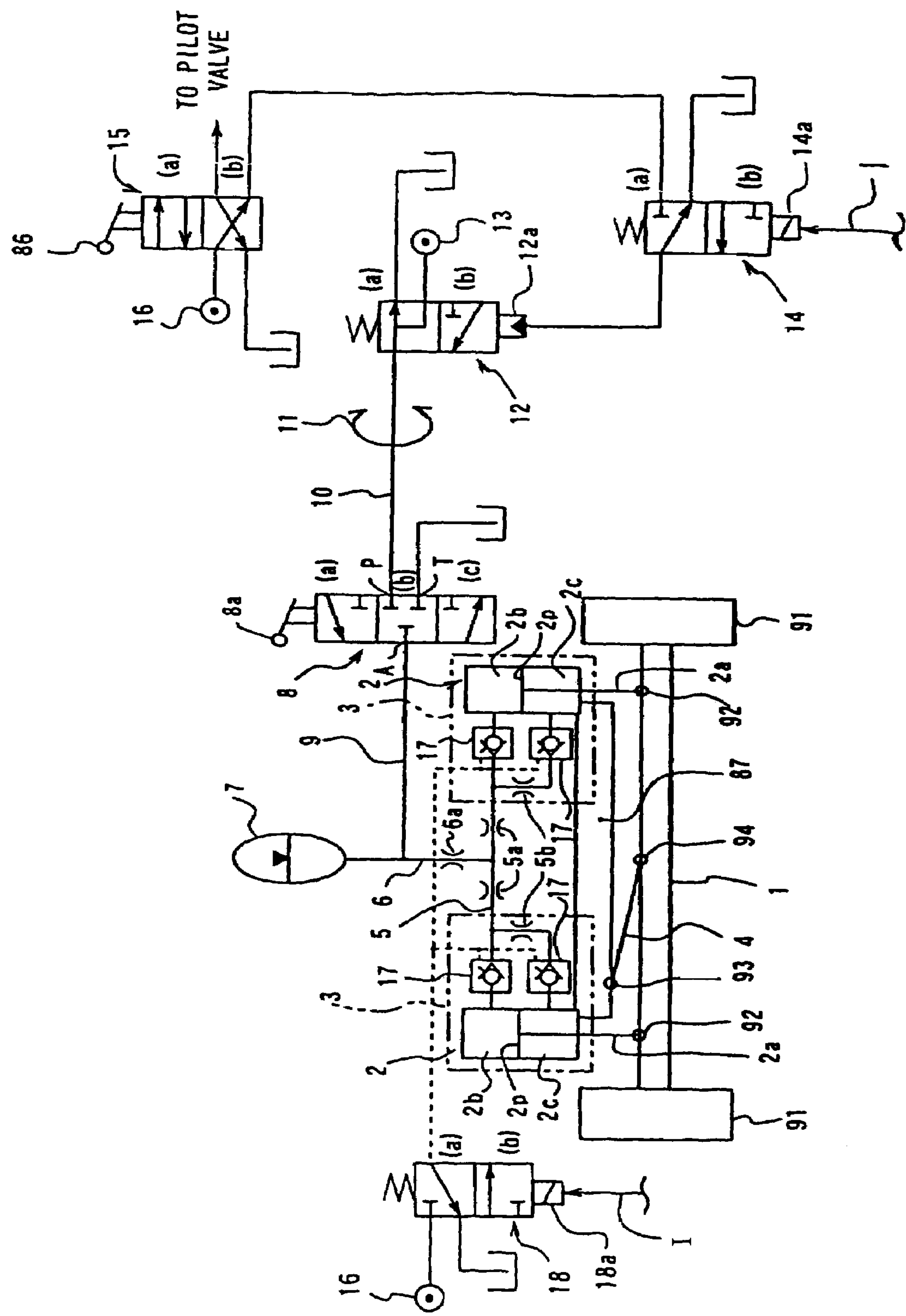
FIG. 11 is a hydraulic circuit diagram of the wheeled work vehicle achieved in the first embodiment of the present invention.

FIG. 11 is a hydraulic circuit diagram illustrating the structure adopted in the suspension of the wheeled work vehicle in the first embodiment of the present invention. The suspension in the embodiment achieves a leveling function and a suspension lock function in addition to a suspension function effected when the vehicle travels. As shown in FIG. 11, the accumulator 7 is connected to the main hydraulic source 13 via the directional control valve 8, the center joint 11 and a hydraulic pilot controlled directional control valve 12. A pilot port 12*a* of the hydraulic pilot controlled directional control valve 12 is connected to a pilot hydraulic source 16 via a solenoid controlled directional control valve 14 and a lock valve 15. The position of the lock valve 15 is switched through an operation of the gate lock lever 86 provided at the operator's cab 85. Namely, when the gate lock lever 86 is set to the release position, the lock valve is switched to position (a), whereas if the gate lock lever 86 is set to the lock position, the lock valve 15 is switched to position (b). The solenoid controlled directional control valve 14 is switched to position (b) when its solenoid 14*a* is excited in response to an electrical signal I to be detailed later and is switched to position (a) as its solenoid 14*a* becomes demagnetized.

When the lock valve 15 and the solenoid controlled directional control valve 14 are both switched to position (b), pilot pressure from the pilot hydraulic source 16 is supplied to the pilot port 12*a* of the hydraulic pilot controlled directional control valve 12 and, as a result, the hydraulic pilot controlled directional control valve 12 is switched to position (b). This allows the pressure oil from the main hydraulic source 13 to be supplied to the directional control valve 8, to enable an adjustment operation for raising the vehicle height. If, on the other hand, at least either the lock valve 15 or the solenoid controlled directional control valve 14 is switched to position (a), the pilot port 12*a* of the hydraulic pilot controlled directional control valve 12 becomes communicated with the tank, thereby switching the hydraulic pilot controlled directional control valve 12 to position (a). Thus, the directional control valve 8 becomes communicated with the tank to prohibit the adjustment operation for raising the vehicle height, thereby enabling an adjustment operation to lower the vehicle height.

Figure 12:
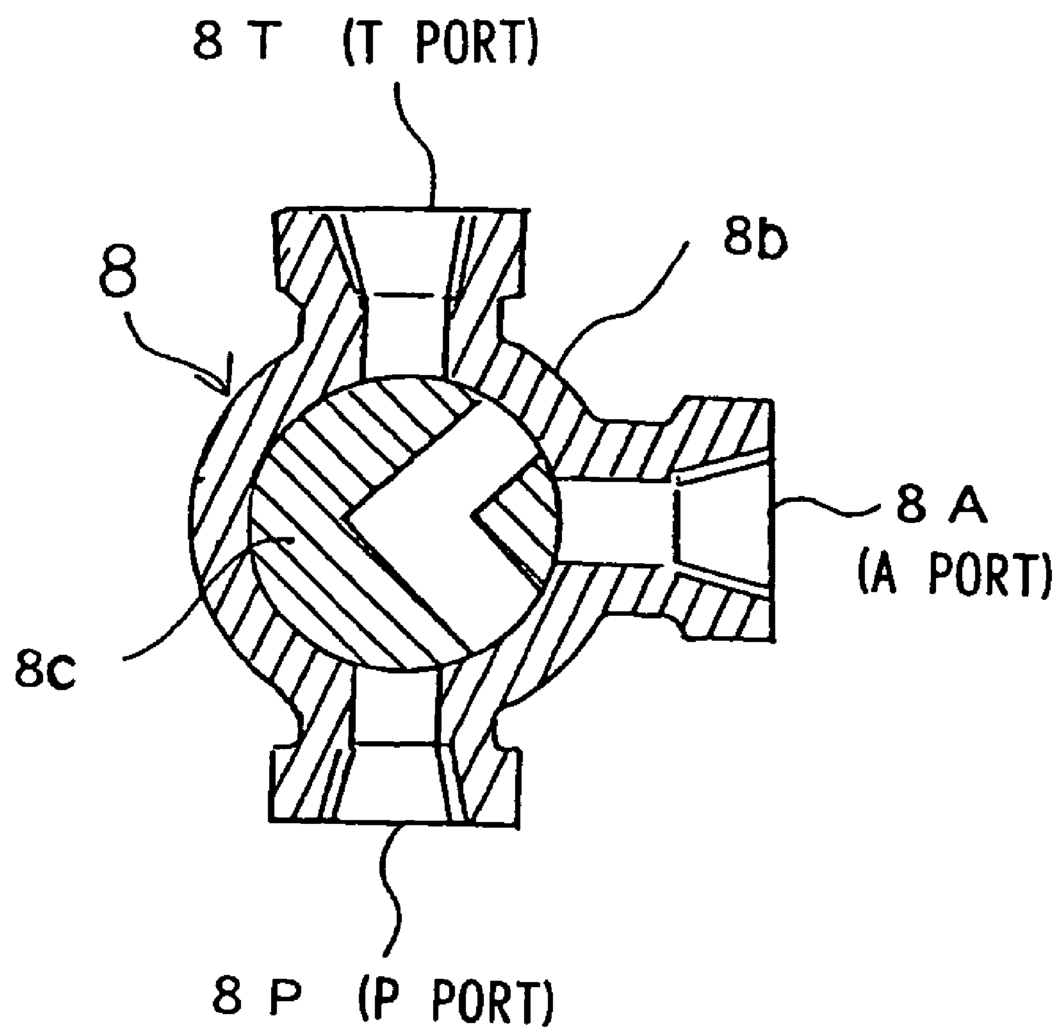
FIG. 12 is a sectional view of the ball-type three-position switching valve constituting hydraulic circuit of the wheeled work vehicle in the first embodiment of the present invention.

The directional control valve 8 is a three-port/three-position switching valve which may be constituted of, for instance, a ball valve as shown in FIG. 12. The directional control valve 8 is switched to position (a) in FIG. 11 when the switching lever 8*a* is set to position A in FIG. 9 to allow an A port 8A to communicate with a P port 8P. If, on the other hand, the switching lever 8*a* is set to position B in FIG. 9, the directional control valve 8 is switched to position (c) to allow the A port 8A to communicate with a T port 8T. When the switching lever 8*a* is set to the neutral position, the directional control valve 8 is switched to position (b) and, as a result, the A port 8A becomes completely cut off from the P port 8P or the T port 8T, as illustrated in FIG. 12 to keep down the quantity of oil leaked from the A port 8A at near 0 level.

The directional control valve 8 is constituted of a body 8*b* at which the P port (pump port) 8P, the T port (tank port) 8T and the A port (service port) 8A are provided and a ball 8*c* provided inside the body 8*b* which can be set to position (a), position (b) or position (c) through an external operation. Thus, the directional control valve 8 functions both as a directional control valve that switches the flow of the pressure oil and as a stop valve used to ensure that the quantity of oil leak is sustained at a near 0 level by blocking the pressure oil flow. When the ball 8*c* is operated between position (a) and position (b), an opening area corresponding to the degree to which the ball 8*c* is moved is achieved, thereby enabling the directional control valve 8 to function as a stop valve with a so-called metering capability.

As illustrated in FIG. 11, a restrictor 6*a* with an area A1 is provided at the line 6 connected to the accumulator 7 and restrictors 5*a* with an area A2 are provided at the line 5 communicating between a pair of cylinder blocks 3, with the restrictors 5*a* and 6*a* achieving a relationship expressed as A1>A2. As high-pressure oil is supplied into the line 5 in response to a contraction of the hydraulic cylinders 2, the pressure from the pressure oil is accumulated at the accumulator 7 via the restrictors 5*a* and 6*a*, and the pressure oil with its pressure thus built up is supplied to the individual hydraulic cylinders 2 to reset the vehicle to the neutral position. In this situation, the accumulator 7 functions as a spring that mainly absorbs vibration, whereas the variable constrictions 5*a* and 6*a* constituting resistors function, as a damper that mainly damps the vibration. The characteristics of the spring and the damper are determined in correspondence to the pressure of the gas charged into the accumulator 7 and the areas of the restrictors 5*a* and 6*a*.

The line 5 is branched to extend in two directions inside each cylinder block 3, with one branch (a passage C2 in FIG. 13) connected to the head chamber 2*b* of the hydraulic cylinder 2 via a pilot check valve 17 and the other branch (a passage C1 in FIG. 13) connected to the rod chamber 2*c* of the hydraulic cylinder 2 via a restrictor 5*b* having an area A3 (the area A3, which is smaller than the area A1, is variable as detailed later) and a pilot check valve 17. The pilot ports of the pilot check valves 17 are connected to the pilot hydraulic source 16 via an solenoid controlled directional control valve 18, and the drive of the pilot check valves 17 is controlled by switching the solenoid controlled directional control valve 18. The solenoid controlled directional control valve 18 is switched to position (b) as its solenoid 18*a* becomes excited by the electrical signal I to be detailed later and is switched to position (a) as the solenoid 18*a* becomes demagnetized.

When the solenoid controlled directional control valve 18 is switched to position (b), the pressure oil from the pilot hydraulic source 16 is supplied to the pilot ports of the pilot check valves 17. Thus, the pilot check valves 17 function simply as release valves to allow the pressure oil to flow from the oil chambers 2*b* and 2*c* of the hydraulic cylinders 2 (an unlocked state). It is to be noted that the flow of the pressure oil at the head chambers 2*b* and the rod chambers 2*c* is regulated by the restrictors 5*b* in this situation, i.e., the restrictors 5*b* function as a damper that mainly damps vibration. When the solenoid controlled directional control valve 18 is switched to position (a), the supply of the pressure oil from the pilot hydraulic source 16 is stopped, thereby allowing the pilot check valves 17 to function as normal check valves and, as a result, any movement of the pressure oil from the oil chambers 2*b* and 2*c* at each hydraulic cylinder 2 becomes prohibited (a locked state).

A wheeled hydraulic excavator is normally engaged in an excavating operation with the front attachment 84 turned toward the rear of the vehicle and thus, the vehicle often travels by leaving the front attachment 84 turned rearward at the work side. Since this shifts the center of gravity of the body toward the rear axle 1', which would allow the rods 2*a* to expand under normal circumstances, the oil flowing out from the rods 2*a* would directly flow into the head chambers 2*b* to cause the rods 2*a* to extend to the stroke limit, and the comfort of the operator would be compromised by the impact occurring at the limit of the stroke unless the restrictors 5*b* were provided at the communicating passages between the rod chambers 2*c* and the head chambers 2*b*. Accordingly, the restrictors 5*b* are provided to achieve a pseudo-spring effect to realize firm suspension performance. In this structure, the restrictors 5*b* can also be utilized to adjust the degree of firmness to a suitable value with ease.

Figure 13:
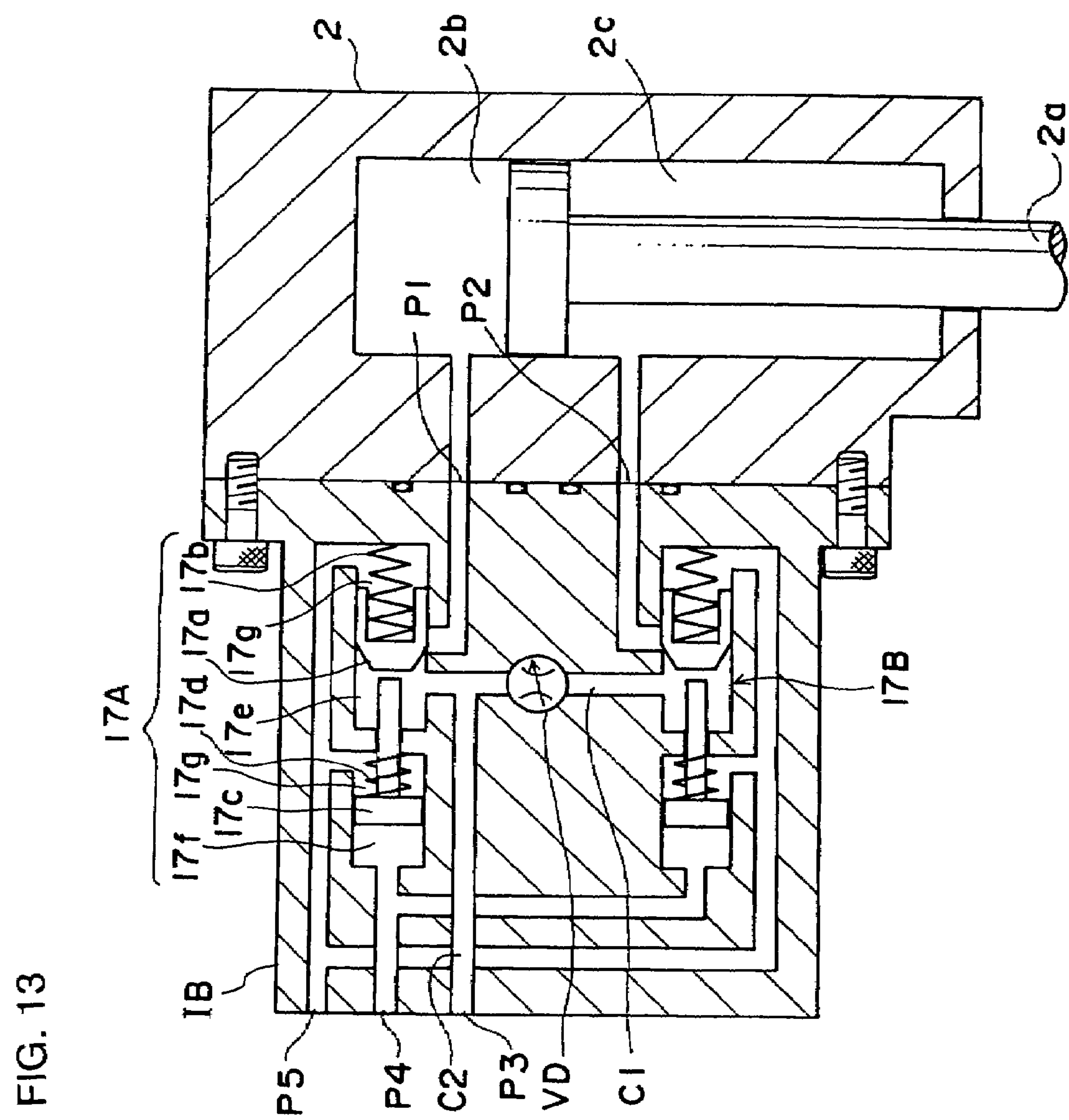
FIG. 13 is a sectional view of a block internally provided with the pilot check valves included in conjunction with a hydraulic cylinder constituting the hydraulic circuit of the wheeled work vehicle in the first embodiment of the present invention.

FIG. 13 shows an example in which the pilot check valves 17 and the restrictor 5*b* are internally provided at an integrated block IB which is then mounted at each suspension hydraulic cylinder 2 as an integrated cylinder. It is to be noted that in FIG. 13, the pair of pilot check valves are referred to as 17A and 17B. The block IB includes five external ports, i.e., a bottom chamber port P1, a rod chamber port P2, an accumulator port P3, a pilot port P4 and a drain port P5. The pilot check valves 17A and 17B are each constituted of a movable valve element 17*a*, a spring 17*b* that applies a force to the movable valve element 17*a*, a plunger 17*c* that drives the movable valve element 17*a* and a return spring 17*d* of the plunger 17*c*. Chambers 17*e* of the pair of pilot check valves 17A and 17B are made to communicate with each other through the passage C1 at which a variable restrictor VD is provided, and the passage C1 communicates with the accumulator port P3 through the passage C2. The damping performance of the suspension is adjusted by varying a restrictor area of the variable restrictor VD through an external operation. Chambers 17*f* of the pair of pilot check valves 17A and 17B are made to communicate with the pilot port P4 and drainage chambers 17*g* of the pair of pilot check valves 17A and 17B are made to communicate with the drain port P5.

In a travelling mode, the plungers 17_c_ move to the right as the pilot pressure is applied to the pilot port P4 to push the movable valve elements 17_a_, thereby allowing the pilot check valves 17A and 17B to function as release valves and ultimately allowing the hydraulic cylinder 2 to function as a suspension. The pilot pressure is not applied to the pilot port P4 in a parking mode or in working mode. In parking mode or working mode, the movable valve elements 17_a_ are not pushed to the right and thus, the pilot check valves 17A and 17B are able to function as check valves through the force applied by the spring 17_b_, thereby cutting off the head chamber 2_b_ and the rod chamber 2_c_ of the suspension hydraulic cylinder 2 from the accumulator port P4 and setting the suspension hydraulic cylinder 2 in a locked state.

Figure 14:
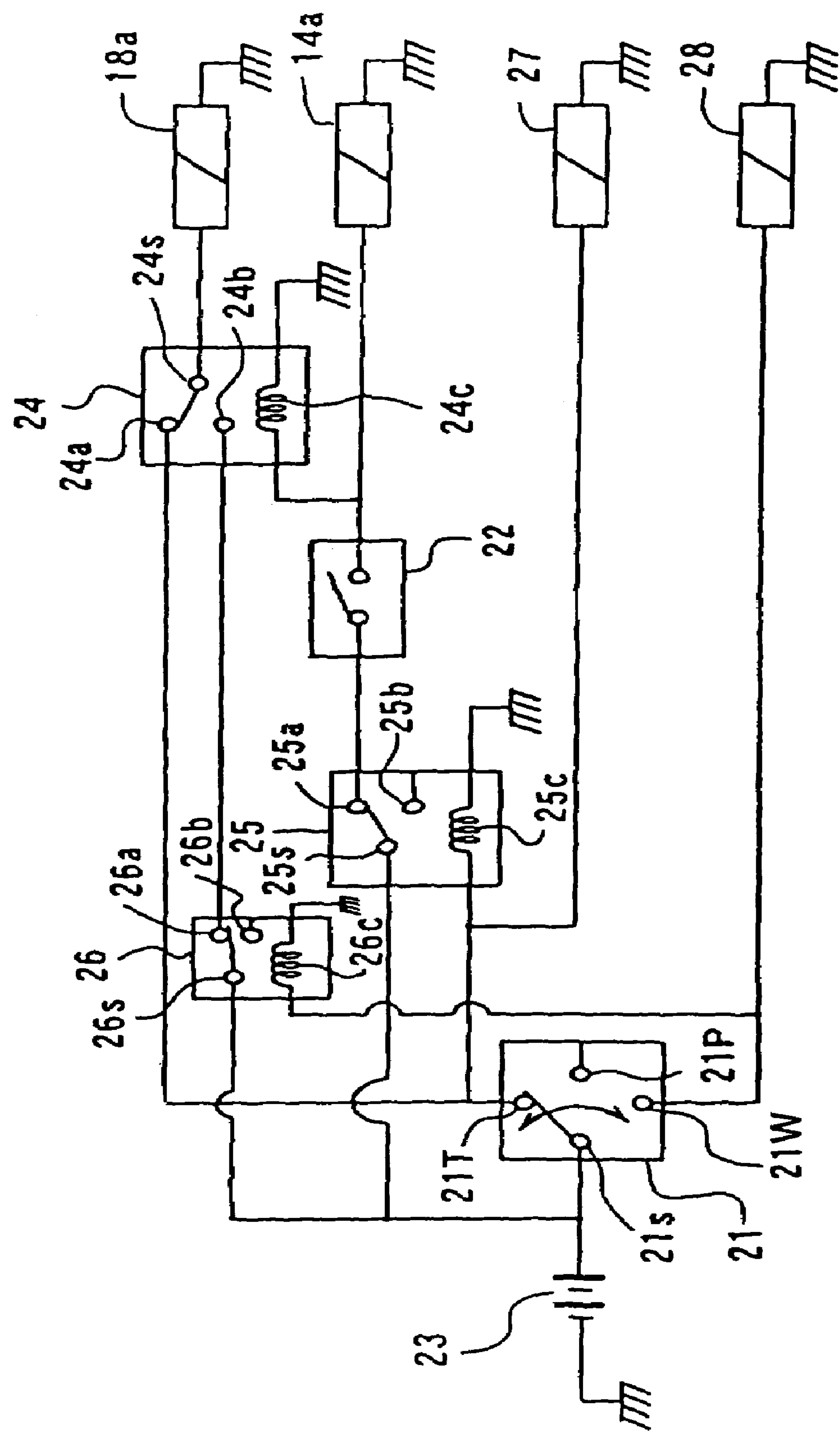
FIG. 14 is an electric circuit diagram of the-wheeled work vehicle achieved in the first embodiment of the present invention.

FIG. 14 is an electric circuit diagram of the suspension in the wheeled work vehicle achieved in the first embodiment. As shown in FIG. 14, a relay circuit is constituted with a brake switch 21 which is a switched to a T contact point 21T, a P contact point 21P or a W contact point 21W in correspondence to the mode setting, i.e. the travelling mode, the parking mode or the working mode, a leveling switch 22 that issues an instruction for leveling the height of the vehicle in response to an operation performed at the operator's cab 85, a power source 23 and relays 24, 25 and 26 in the electric circuit, and this relay circuit implements control on whether or not the electrical signal I is to be provided to the solenoids 14_a_ and 18_a_ of the solenoid controlled directional control valves 14 and 18, a solenoid 27 for parking brake release and a solenoid 28 for working brake activation.

To give a more detailed explanation in reference to FIG. 14, a common contact point 21_s_ of the brake switch. 21 is connected to the power source 23, the T contact point 21T is connected to an "a" contact point 24_a_ of the relay 24, a coil 25_c_ of the relay 25 and the solenoid 27 for parking brake release and the W contact point 21W is connected to a coil 26_c_ of the relay 26 and the solenoid 28 for working brake activation, with the P contact point 21P left open. As the brake switch 21 is switched to the W contact point 21W, the solenoid 28 for working brake activation becomes excited to engage the working brake and, at the same time, the solenoid 27 for parking brake release becomes demagnetized to engage the parking brake as, well. When the brake switch 21 is switched to the P contact point 21P, the solenoid 27 for parking brake release becomes demagnetized to engage the parking brake. It is to be noted that the illustration of the working brake and the parking brake which are of the known art is omitted.

The solenoid 18_a_ of the solenoid controlled directional control valve 18 is connected to a common contact point 24_s_ of the relay 24, a "b" contact point 24_b_ of the relay 24 is connected to an "a" contact point 26_a_ of the relay 26, a common contact point 26_s_ of the relay 26 is connected to the power source 23 and a "b" contact point 26_b_ of the relay 26 is left open. In addition, a solenoid 14_a_ of the solenoid controlled directional control valve 14 is connected to the leveling switch 22, the leveling switch 22 is connected to an "a" contact point 25_a_ of the relay 25 and a common contact point 25_s_ of the relay 25 is connected to the power source 23, with a "b" contact point 25_b_ of the relay 25 left open. As a result, when the brake switch 21 is switched to the P contact point 21P or to the W contact point 21 W, the relay 25 is switched to the "a" contact point 25_a_, and if the leveling switch 22 is turned on in this state, the solenoid 14_a_ of the solenoid controlled directional control valve 14 becomes connected to the power source 23 and thus becomes excited. If, on the other hand, the brake switch 21 is switched to the P contact point 21P and the leveling switch 22 is turned on, the relay 24 and the relay 26 are respectively switched to the "b" contact point 24_b_ and the "a" contact point 26_a_ and, as a result, the solenoid 18_a_ of the solenoid controlled directional control valve 18 becomes connected to the power source 23 and thus becomes excited. In other words, by turning on the leveling switch 22 in the parking mode, the pilot check valves 17 are set in a released state to enable a leveling operation through an operation of the switching lever 8_a_ as long as other leveling conditions are met. If the brake switch 21 is switched to the T contact point 21T, the relay 24 is switched to the "a" contact point 24_a_, and thus the solenoid 18_a_ of the solenoid controlled directional control valve 18 becomes connected to the power source 23 and becomes excited. This opens the pilot check valves 17 to utilize the hydraulic cylinders 2 as a suspension system when the vehicle travels.

Next, the suspension operation achieved in the embodiment is explained in further detail.

(1) Travelling Mode

In the travelling mode, the brake switch 21 is switched to the T contact point 21T as shown in FIG. 14. Thus, the solenoid 28 for working brake activation is demagnetized to release the working brake and, at the same time, the solenoid 27 for parking brake release is excited to release the parking brake. In addition, power is supplied to the coil 25_c_ of the relay 25 to switch the relay 25 to the "b" contact point 25_b_, which disconnects the circuit extending to the solenoid 14_a_ of the solenoid controlled directional control valve 14 to demagnetize the solenoid 14_a_, thereby setting the solenoid controlled directional control valve 14 to position (a). Furthermore, the circuit extending to the coil 26_c_ of the relay 26 is cut off to switch the relay 26 to the "a" contact point 26_a_ and, at the same time, the circuit extending to a coil 24_c_ of the relay 24 is cut off to switch the relay 24 to the "a" contact point 24_a_, thereby exciting the solenoid 18_a_ and ultimately setting the solenoid controlled directional control valve 18 to position (b). It is to be noted that the solenoid 14_a_ becomes demagnetized and the solenoid 18_a_ becomes excited in the travelling mode, independently of the operation of the leveling switch 22.

When the solenoid 14_a_ is demagnetized as described above in the hydraulic circuit shown in FIG. 11, the solenoid controlled directional control valve 14 is switched to position (a) to allow the pilot port 12_a_ of the hydraulic pilot controlled directional control valve 12 to communicate with the tank. As a result, the hydraulic pilot controlled directional control valve 12 is switched to position (a) and the P port of the directional control valve 8 becomes communicated with the tank. In addition, when the solenoid 18_a_ is excited as the above, the solenoid controlled directional control valve 18 is switched to position (b), thereby allowing the pressure oil from the pilot hydraulic source 16 to be supplied to the pilot ports of the pilot check valves 17. As the pilot check valves 17 simply function as release valves, the pressure oil is allowed to move between the head chambers 2_b_ and the rod chambers 2_c_ of the individual hydraulic cylinders 2 and the accumulator 7 to achieve the suspension function.

In addition, in the travelling mode, the switching lever 8_a_ is switched to the neutral position shown in FIG. 9 with the retaining cover 45 retaining the switching lever 8_a_ at the neutral position. Consequently, even if the switching lever 8_a_ is subjected to an impact due to a falling object, vibration or the like from the ground surface while the vehicle is travelling, the switching lever 8_a_ retains the neutral state to prevent the pressure oil from the directional control valve 8 from flowing out. In other words, the vehicle height is not lowered due to an external impact while the vehicle travels.

If a high-cycle vibration occurring as a result of, for instance, the work vehicle travelling at high speed on a rough road surface is input to the piston rods 2*a* via the tires 91 and the axle 1 in the travelling mode described above, some of the pressure oil (dynamic pressure oil) from the hydraulic cylinder 2 on the high-pressure side (the contracting cylinder) travels to the accumulator 7 via the restrictors 5*a* and 6*a*, to build up the pressure of the pressure oil at the accumulator 7 and then the pressure oil is supplied to the individual hydraulic cylinders 2 to reset the body to the neutral position. At this time, the accumulator 7 functions as a spring which absorbs the vibration of the piston rods 2*a*, and firmer suspension is achieved as the gas pressure in the accumulator 7 increases. In addition, the restrictors 5*a*, 5*b* and 6*a* function as a damper which regulates the communication of the vibration, and the hydraulic cylinders 2 engage in a stroking motion less readily as the sizes of the restrictors become smaller to increase the damping performance. Through the expansion/contraction of the hydraulic cylinders 2 which occurs as the pressure oil travels as described above, the axle 1 is caused to move vertically or to rock relative to the frame 70, and thus, even when an external force from the ground surface is applied to the tires 91 while the vehicle travels, the external force is not directly communicated to the frame 70. It is to be noted that in this vehicle, the axle 1 moves vertically if, for instance, an external force is applied to both the left tire 91 and the right tire 91 along the same direction and the left and right hydraulic cylinders 2 expand/contract in the same direction, whereas the axle 1 rocks if an external force is applied to only either the left tire or the right tire and the left and right hydraulic cylinders 2 expand/contract along directions opposite from each other.

If a low-cycle vibration attributable to rough ground surface is input to the piston rods 2*a* while the work vehicle travels at low speed, the pressure oil (static pressure oil) is supplied from the hydraulic cylinder 2 on the high-pressure side to the hydraulic cylinder 2 on the low pressure side, thereby equalizing the pressures at the individual hydraulic cylinders 2. As a result, it becomes possible to sustain the grounding pressures at the tires 91 at levels equal to each other even when the ground surface is bumpy, to improve the stability of the work vehicle. When the work vehicle is in a stationary state, the pressures at the individual cylinders 2 become equal to each other to stop the pressure oil flow, and the hydraulic cylinders 2 enter a stationary state at a position at which the gravitational force W imparted from the attachment 84 and the force F applied to the pistons 2*p* in the hydraulic cylinders 2 are in balance (W=F). It is to be noted that the force F applied to each piston 2*p* in this situation is expressed as; F=P X (S1–S2), with S1 representing the area over which the pressure is received at the piston 2*p* in the head chamber 2*b*, S2 representing the area over which the pressure is received at the piston 2*p* in the rod chamber 2*c* and P representing the pressure within the hydraulic cylinder 2.

Figure 15A:
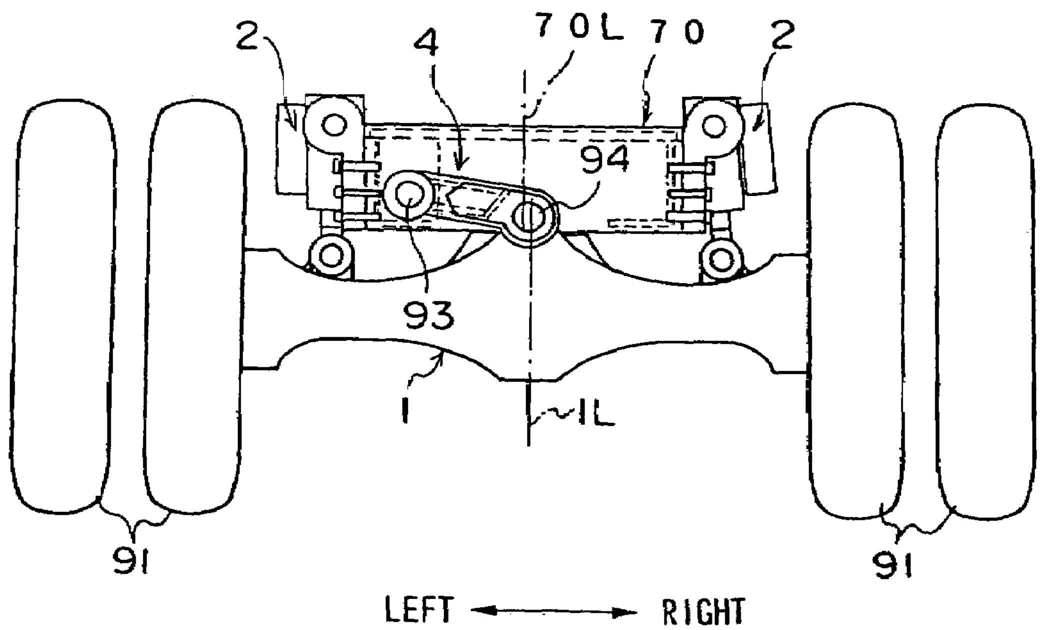
FIGS. 15A and 15B present an example of the suspension operation achieved in the wheeled work vehicle in the first embodiment of the present invention.
Figure 15B:
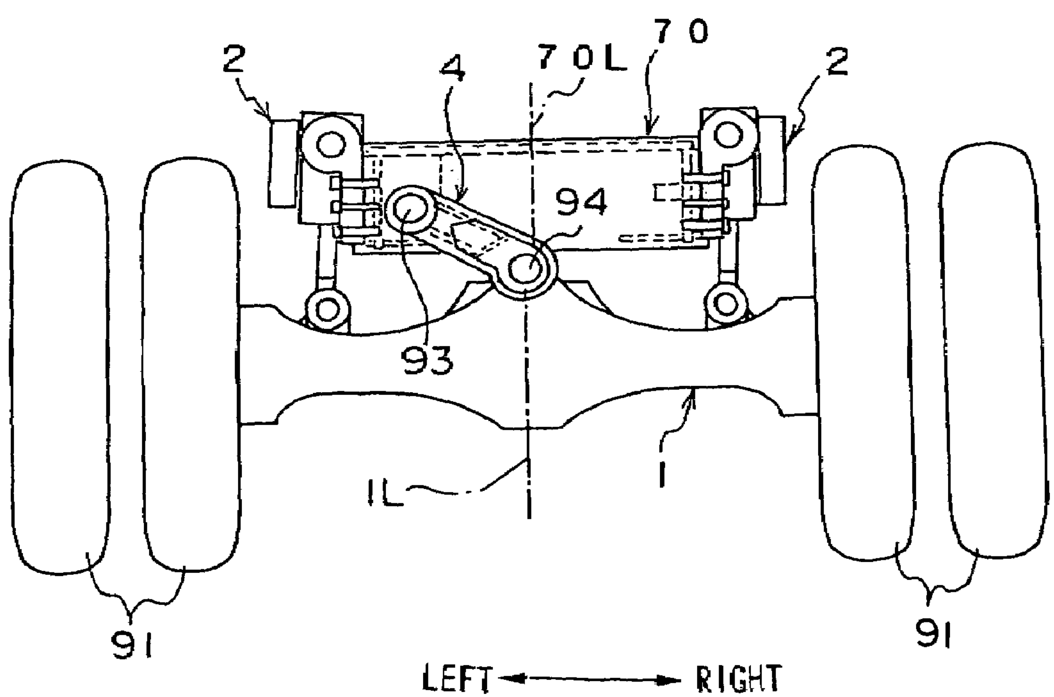

Now, the displacement of the frame 70 relative to the axle 1 is explained in reference to an example. Let us assume that the vehicle height is adjusted to align the central line 70L of the frame 70 with the central line 1L of the axle 1 as shown in FIG. 5 in the initial state. If the left and right wheels are subject to impact at the same time in this state and the hydraulic cylinders 2 contract as a result, the link 4 rotates around the pin 93, as shown in FIG. 15A to shift the central line 70L of the frame 70 to the left relative to the central line 1L of the axle 1. If the hydraulic cylinders 2 expand, on the other hand, the central line 70L of the frame 70 becomes shifted to the right relative to the central line 1L of the axle 1 as shown in FIG. 15B. While a side surface of the frame 70 is set closer to the hydraulic cylinder 2 if the central line 70L of the frame 70 and the central line 1L of the axle 1 become misaligned from each other in this manner, the hydraulic cylinders 2 are mounted so that their axes 2L form an A-line shape in the initial state as shown in FIG. 5 to prevent any interference from occurring between the side surface of the frame 70 and the hydraulic cylinder 2.

(2) Parking Mode

In the parking mode, the brake switch 21 is switched to the P contact point 21P as shown in FIG. 14. As a result, the solenoid 27 for parking brake release and the solenoid 28 for working brake activation both become demagnetized, which engages the parking brake and releases the working brake. If the leveling switch 22 is turned off (opened) at this time, the solenoid 14*a* of the solenoid controlled directional control valve 14 is demagnetized and, at the same time, the circuit extending to the coil 24*c* of the relay 24 is disconnected to switch the relay 24 to the "a" contact point 24*a* and ultimately to demagnetize the solenoid 18*a* of the solenoid controlled directional control valve 18.

As illustrated in FIG. 11, the electromagnetic switching valves 14 and 18 are both switched to position (a) when the solenoids 14*a* and 18*a* are demagnetized. Thus, the hydraulic pilot controlled directional control valve 12 is switched to position (a), the P port of the directional control valve 8 becomes communicated with the tank and the pressure oil supplied to the pilot ports of the pilot check valves 17 is stopped, thereby allowing the pilot check valves 17 to function as check valves to prohibit any movement of the pressure oil from the oil chambers 2*b* and 2*c* of the individual hydraulic cylinders 2. In other words, even if the switching lever 8*a* is operated with retaining cover 45 removed while the leveling switch 22 is in an OFF state, the supply/discharge of the pressure oil to/from the hydraulic cylinders 2 is prohibited and thus, the vehicle height does not fluctuate in an undesirable manner.

Figure 16C:
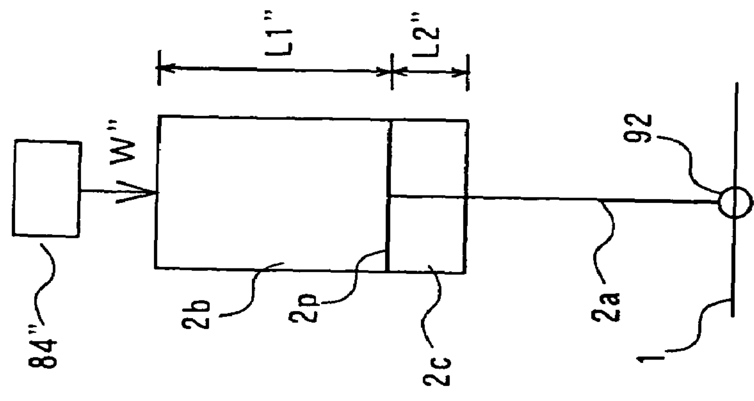
FIGS. 16A, 16B and 16C show the expanded/contracted states of a hydraulic cylinder in the wheeled work vehicle in the first embodiment of the present invention.
Figure 16B:
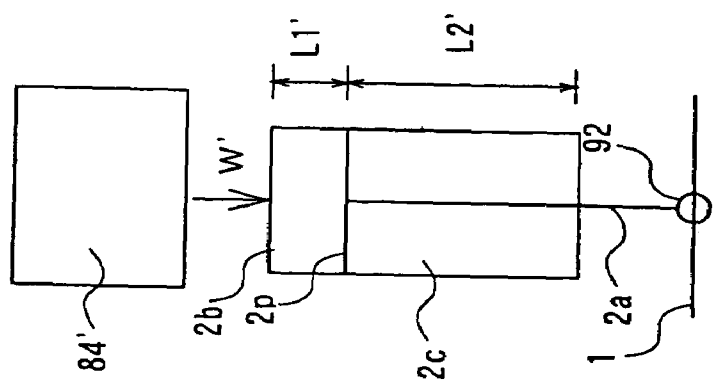
Figure 16A:
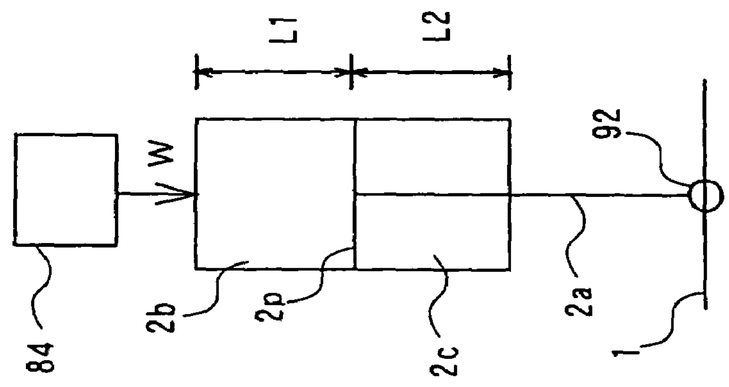

While the vehicle can be adjusted to a desired height in correspondence to the type of the attachment 84 in use, this adjustment is implemented in the parking mode in the embodiment. The following is an explanation of the height adjustment (leveling operation). It is assumed that under the initial conditions, an attachment 84 with standard weight w is mounted and each piston 2*p* is in a stationary state at the position at which the allowable stroke distances L1 and L2 for the hydraulic cylinder 2 along the contracting direction and the expanding direction are equal to each other (L1=L2) as shown in FIG. 16A. If the attachment 84 is replaced with an attachment 84' with weight W' (>W), the hydraulic cylinders 2 contract to lower the vehicle height at the front, resulting in reduced allowable stroke distance L1' (L1'<L1) along the contracting direction as shown in FIG. 16B. If, on the other hand, the attachment 84 is replaced with an attachment 84" with weight W" (<W ), the hydraulic cylinders 2 expand to increase the vehicle height at the front, resulting in a reduced allowable stroke distance L2" (L2"<L2) along the expanding direction, as shown in FIG. 16C. As described above, when the attachment 84 is replaced, the vehicle height becomes reduced or increased, which results in a smaller allowable stroke distance L1" or L2" in the contracting direction or the expanding direction, and since the suspension function cannot be fully effected under such circumstances, the comfort of the operator is compromised. This may be prevented by sustaining a suitable vehicle height. (e.g., L1'=L2', L1"=L2") when the attachment 84 is replaced through a leveling operation. In the embodiment, if it is in the state of the suitable vehicle height described above, the height of the projections 73*b* provided at the front plate 73 of the frame 70 is set equal to the height of the nipple 94*a* at the head of the pin 94 of the axle 1 (see FIG. 3).

Since the brake switch 21 is switched to the P contact point 21P, no power is supplied to the coils 25*c* and 26*c* of the relays 25 and 26, thereby switching the relays 25 and 26 to the (a) contact points 25*a* and 26*a* respectively in the parking mode, as illustrated in FIG. 14. If the leveling switch 22 is turned on (closed) to perform a leveling operation in this state, the solenoid 14*a* of the solenoid controlled directional control valve 14 becomes excited and power is supplied to the coil 24*c* of the relay 24 to switch the relay 24 to the “b” contact point 24*b*, thereby exciting the solenoid 18*a* of the solenoid controlled directional control valve 18.

As shown in FIG. 11, when the solenoids 14*a* and 18*a* are excited, both the solenoid controlled directional control valves 14 and 18 are switched to position (b). In addition, a locking operation is performed at the gate lock lever 86 to switch the lock valve 15 to position (b) when performing a leveling operation. As a result, the pressure oil from the pilot hydraulic source 16 is supplied to the pilot port 12*a* of the hydraulic pilot controlled directional control valve 12, switching the hydraulic pilot controlled directional control valve 12 to position (b), and, in addition, the pressure oil from the pilot hydraulic source 16 is also supplied to the pilot ports of the pilot check valves 17 to utilize the pilot check valves 17 as release valves.

In this situation if, for instance, the hydraulic cylinders 2 are in the state shown in FIG. 16B (L1'<L2'), i.e., if the height of the projections 73*b* provided at the front plate 73 of the frame 70 is smaller than the height of the nipple 94*a* provided at the end of the pin 94 at the axle 1 and, therefore, the hydraulic cylinders 2 must expand to achieve a state in which L1'=L2', the operator inserts his hand in the clearance between the side plate 71 and the tire 91 at the right front of the frame 70 to remove the retaining cover 45 by loosening the wing nuts 46. Then, the operator turns the switching lever 8*a* toward the A position in FIG. 9 to switch the directional control valve 8 to position (a). As a result, the pressure oil from the main hydraulic source 13 is supplied to the oil chambers 2*b* and 2*c* of the individual hydraulic cylinders 2 via the directional control valve 8, which increases the force F applied to the pistons 2*p* (the force applied in the expanding direction) to expand the hydraulic cylinders 2, resulting in an increase in the vehicle height.

If, on the other hand, the hydraulic cylinders 2 are in the state shown an FIG. 16C (L1">L2"), i.e., if the height of the projections 73*b* provided at the front plate 73 of the frame 70 is greater than the height of the nipple 94*a* provided at the end of the pin 94 of the axle 1 and thus, the hydraulic cylinders 2 must contract to achieve a state in which L1"=L2", the switching lever 8*a* is turned toward the B position in FIG. 9 to switch the directional control valve 8 to position (c). This causes the pressure oil from the oil chambers 2*b* and 2*c* at the individual hydraulic cylinders 2 to be discharged into the tank via the directional control valve 8, which results in a reduction in the force F applied to the pistons 2*p* to contract the hydraulic cylinders 2, thereby reducing the vehicle height. When the height of the projections 73*b* is set equal to the height of the nipple 94*a* by increasing or decreasing the vehicle height in this manner, i.e., when L1'=L2' or L1"=L2" is achieved, the switching lever 8*a* is turned to the neutral position to switch the directional control valve 8 to position (b). Then, the retaining cover 45 is mounted to ensure that the switching lever 8*a* is not inadvertently operated.

(3) Working Mode

In the working mode, the brake switch 21 is switched to the W contact point 21W. In response, the solenoid 28 for working brake activation becomes excited and the solenoid 27 for parking brake release becomes demagnetized, thereby engaging both the working brake and the parking brake. In addition, no power is supplied to the coil 25*c* of the relay 25, switching the relay 25 to the “a” contact point 25*a*, and power is supplied to the coil of the relay 26, switching the relay 26 to the “b” contact point 26*b*. As a result, the solenoid 18*a* of the solenoid controlled directional control valve 18 is not excited even if power is supplied to the coil 24*c* of the relay 24 due to an erroneous operation of the leveling switch 22, and thus, the solenoid controlled directional control valve 18 is switched to position (a) to allow the pilot check valves 17 to function as check valves. Consequently, the vehicle height is not allowed to fluctuate even when the leveling switch 22 is operated erroneously.

In addition, the following interlocking system is adopted in the embodiment to further improve safety performance. If the leveling switch 22 is turned on by mistake, the solenoid 14*a* of the solenoid controlled directional control valve 14 becomes excited to switch the solenoid controlled directional control valve 14 to position (b). However, since a locking operation is performed at the gate lock lever 86 in the working mode, the lock valve 15 is switched to position (a) and thus, no pressure oil is supplied to the pilot port 12*a* of the hydraulic pilot valve 12, allowing the P port of the directional control valve 8 to communicate with the tank. While the retaining cover 45 is mounted in the working mode to prevent the switching lever 8*a* from shifting from the neutral position, the pilot check valve 17 function as check valves as explained above and the P port of the directional control valve 8*a* communicates with the tank even if the switching lever 8 should depart from the neutral position so that any movement of the pressure oil from the oil chambers 2*b* and 2*c* of the hydraulic cylinders 2 is prohibited with a high degree of reliability.

The pressure oil from the pilot hydraulic source 16 is supplied to the work pilot valve (not shown) via the lock valve 15 in working mode, if an operating lever (not shown) is operated to drive the attachment 84, for instance, the pilot pressure on oil is guided to a pilot control valve in a quantity that is in proportion to the degree to which the operating lever has been operated to operate the control valves, thereby enabling an operation such as excavation. Since any movement of the pressure oil from the oil chambers 2*b* and 2*c* of the hydraulic cylinders 2 is prohibited at this time, the hydraulic cylinders 2 do not engage in any stroke motion and, consequently, the reactive force (excavation reactive force) attributable to the excavating motion is not absorbed by the accumulator 7, allowing the operation to be performed in a stable manner in a suspension locked state.

In addition, since the mounting tolerance of the link 4 along the forward/backward direction (the clearance along the forward/backward direction) is set smaller than the mounting tolerance for the hydraulic cylinders 2 along the forward/backward direction (the play in the forward/backward direction), the load applied from the attachment 84 in the forward/backward direction is communicated to the link 4, and thus, no load is applied to the hydraulic cylinders 2 along the forward/backward direction. As a result, the hydraulic cylinders 2 are protected. In this structure, since the link 4 is formed in a box shape and the reinforcement plates 4*b* are provided outside the main plates 4*a*, the flexural rigidity and the torsional rigidity of the link 4 are improved to assure a sufficient strength to withstand the excavating load.

The advantages achieved in the embodiment adopting the structure described above are now explained.

(1) Since the frame 70 and the axle 1 are linked via the pair of hydraulic cylinders, i.e., the left and right hydraulic cylinders 2, and a single link 4, any impact imparted from the axle 1 while the vehicle travels is absorbed to allow the axle 1 to move vertically or to rock in a smooth manner relative to the frame 70. In addition, since the rod chambers 2*c* and the head chambers 2*b* of the hydraulic cylinders 2 are made to communicate with the accumulator 7 via the restrictors 5*a*, 5*b* and 6*a*, the shock occurring when the hydraulic cylinders 2 expand/contract can be absorbed effectively.

Figure 17:
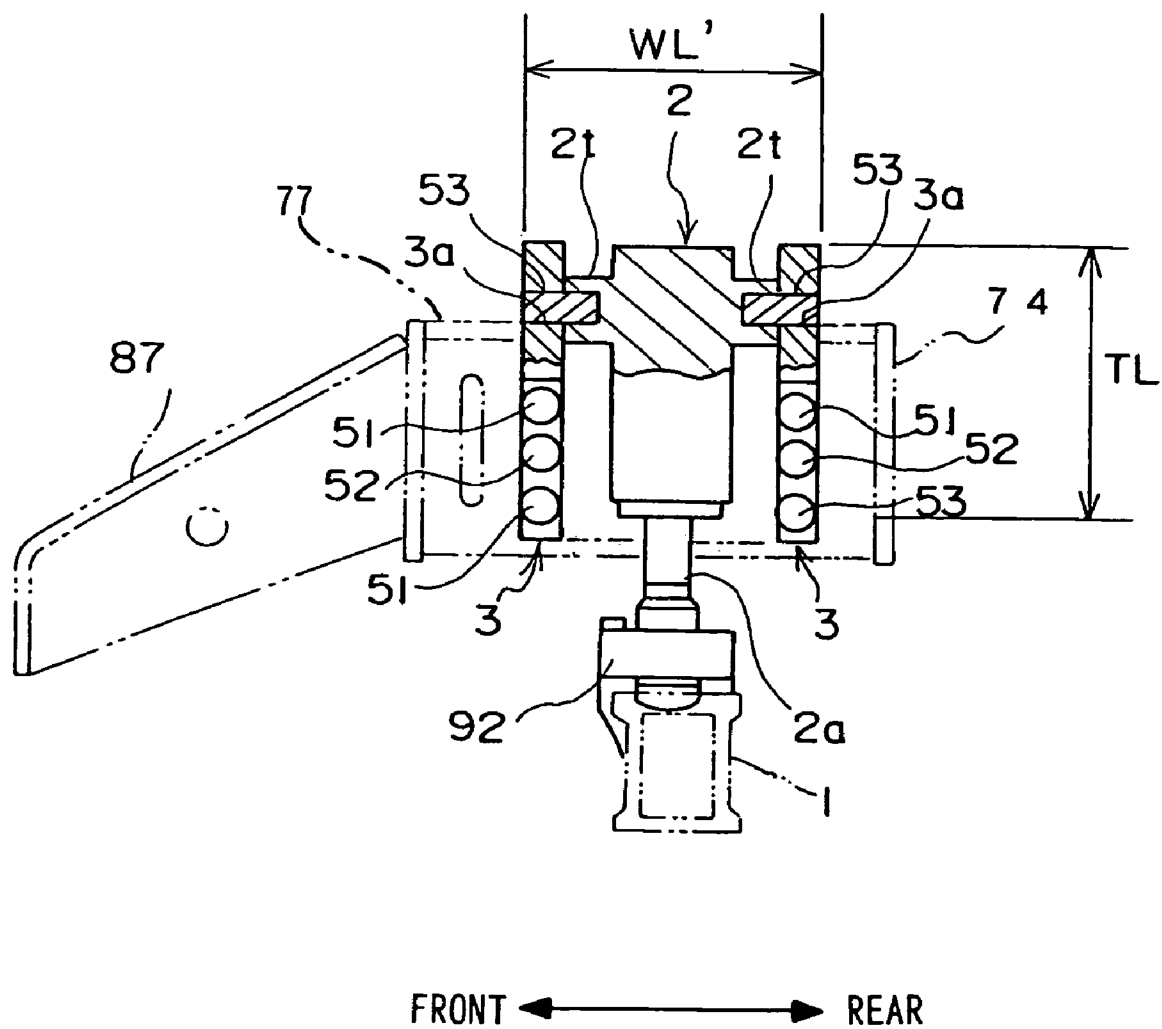
FIG. 17 presents an example of a variation of FIG. 6.

(2) Since the hydraulic cylinders 2 are supported by adopting the trunnion system, the entire length (TL in FIG. 6) of the cylinder tubes can be reduced, which makes it possible to create extra space for storage between the cylinder tubes and the swiveling body 83. In addition, since each hydraulic cylinder 2 is connected with the bracket 3 via the projections 2*t* provided at the cylinder tube, the width WL extending along the forward/backward direction can be reduced (WL<WL') compared to the width of a hydraulic cylinder having pins 53 inserted at the projections 2*t* of the cylinder tube and linked with the bracket 3 via the pins 53, as shown in FIG. 17. Furthermore, since the position of the bracket 3 is set with the knock pins 52, it can be prevented that the projections 2*t* of the hydraulic cylinder 2 one-sidedly come into contact with the inner walls of the openings 3*a* of the bracket 3. Moreover, since the hydraulic cylinders 2 are installed by ensuring that their axes 2L form an A-line shape, the hydraulic cylinders 2 and the frame 70 do not interfere with each other when the hydraulic cylinders 2 expand/contract.

(3) Since the restrictor 5*b* provided at the passage C1 communicating between the head chamber 2*b* and the rod chamber 2*c* of each suspension hydraulic cylinder 2 is a variable restrictor, the suspension performance, in particular the damping performance, can be adjusted with ease. In addition, the degree of firmness of the suspension can be adjusted with ease even while the vehicle travels with the center of gravity shifted to the rear due to the front attachment turned to the rear. Furthermore, since the drain oil from the pair of pilot check valves 17A and 17B internally provided in the block IB which also includes the variable restrictor VD and is mounted as an integrated part of each suspension hydraulic cylinder 2 can be returned to the tank via a single drain port P5 provided at the block IB, the drain line can be simplified.

(4) In the hydraulic circuit in which the vehicle height is adjusted by controlling the supply/discharge of the pressure oil to/from the hydraulic cylinders 2, the function of a switching valve for selecting supply/discharge of the pressure oil and the function of a stop valve for cutting off the hydraulic cylinders 2 from the hydraulic pump 13 and the tank are both realized in the ball-type three-position directional control valve 8, any leak of the pressure oil from hydraulic cylinders 2 can be prevented with a high degree of reliability to ensure that the vehicle height does not change in an undesirable manner as long as the directional control valve 8 is switched to the neutral position. In addition, by providing the retaining cover 45 to retain the switching lever 8*a* for switching the directional control valve 8 at the neutral position, the switching valve 8 can be retained at the neutral position at all times (the function of a stop valve), thereby ensuring that the leak of the pressure oil from the hydraulic cylinders 2 and the quantity of the pressure oil supplied to the hydraulic cylinders 2 are minimized.

(5) Since the directional control valve and the stop valve are realized in a single valve, a compact system is achieved. In addition, since the metering capability (flow regulating performance) that reflects the degree to which the ball 8*c* internally provided at the body 8*b* is operated is achieved, a smoother movement of the upper swiveling body 83 is achieved during a leveling operation. Furthermore, since the ball-type three-position directional control valve 8 is provided at the downstream side of the center joint 11, i.e., since the directional control valve 8 is provided in close proximity to the accumulator 7 and the hydraulic cylinders 2, the hydraulic piping length (more specifically, the length of the line 9) connecting the stop valve 8 and the accumulator 7 is reduced, which makes it possible to reduce the extent to which the piping length affects the suspension performance mainly designed in conformance to the capacity of the accumulator 7. Since the line 9 is constituted of rubber hose in the embodiment, the suspension performance is expected to deteriorate due to an elastic deformation attributable to the high pressure. Accordingly, a rubber hose achieving pressure withstanding performance (e.g., 34.3 MPa) which is higher than the maximum pressure (e.g., 8.8 MPa) of the suspension hydraulic circuit by an ample margin is used to prevent the suspension performance from deteriorating by minimizing the degree of elastic deformation.

(6) Since the height of the diaphragm-type accumulator 7 provided in the middle of the line 5 communicating between the hydraulic cylinders 2 is smaller than the height of a bladder-type hydro-pneumatic accumulator achieving the same capacity, the accumulator 7 can be installed with a high degree of efficiency (by effectively utilizing the available space) within the space formed by the right and left side plates 75 and 76 and the upper plate 77. In addition, since the accumulator 7 is horizontally installed, it is not necessary to draw out the line 6 connected to the accumulator 7 in the downward direction, and thus the overall height of the accumulator 7, which includes the line 6, can be reduced.

(7) Since the switching valves 12, 14 and 15 that are switched by interlocking with the operation of the brake switch 21 and the gate lock lever 86 are provided and the pressure oil is supplied to the P port of the directional control valve 8 only when the parking brake is engaged and the gate lock lever 86 is set at the lock position (a work prohibited state), i.e., only when the parking mode is selected, to allow of the vehicle height to be adjusted through an operation of the switching lever 8*a*, no leveling operation is performed when the vehicle is travelling or is engaged in work. As a result, it is not necessary to consider the leveling function while the vehicle is travelling, to simplify the settings at the various cylinders involved in achieving the suspension performance. At the same time, since any movement of the pressure oil from the oil chambers 2*b* and 2*c* of the hydraulic cylinders 2 is prohibited by the check valves 17 during a work operation, the operator is able to feel the excavation reactive force while working without any extraneous reactions. In addition, since the relay circuit constituted of the brake switch 21, the relays 24~26 and the like prohibit a leveling operation (so-called interlocking) even when the leveling switch 22 is turned on by mistake while the vehicle is travelling or is engaged in work or even when the switching lever 8*a* is operated during work without mounting the retaining cover 45 (the switching lever cannot be operated while the vehicle is travelling), no undesirable leveling operation is performed. Furthermore, since a leveling operation is prohibited while the vehicle is travelling or engaged in work, the pressure oil from the main hydraulic source 13 is not utilized for frequent control of the pressure at the hydraulic cylinders 2, thereby achieving a reduction in fuel consumption.

(8) With the switching lever 8*a* that drives the ball-type three-position directional control valve 8 projecting out to the side of the vehicle from the side plate 71 of the frame 70 and the fender 61F covering the switching lever 8*a* from the front, and above relative to the vehicle, the switching lever 8*a* is protected from falling objects and the like. In addition, since the switching lever 8*a* is set further frontward in the vehicle relative to the hydraulic cylinders 2 located directly above the axle 1, the operator does not need to insert his hand into a deep recess to improve the operability, and can perform a leveling operation with ease and reliability by visually checking any positional changes occurring with regard to the hydraulic cylinders 2 and the link 4 from the front of the vehicle. Moreover, by providing the notched portion 73*c* having the projections 73*b* at the front plate 73 of the frame 70, it becomes possible to visually check the positional relationship between the projection 73*b* and the pin 94 from the front of the vehicle to achieve a fine adjustment of the vehicle height with ease and also, the ease of assembly work for linking the axle 1 and the frame 70 and the ease of maintenance are improved. In addition, the structure is simplified since the control device for leveling and the like are not required to achieve a reduction in the production cost.

Second Embodiment

Figure 18:
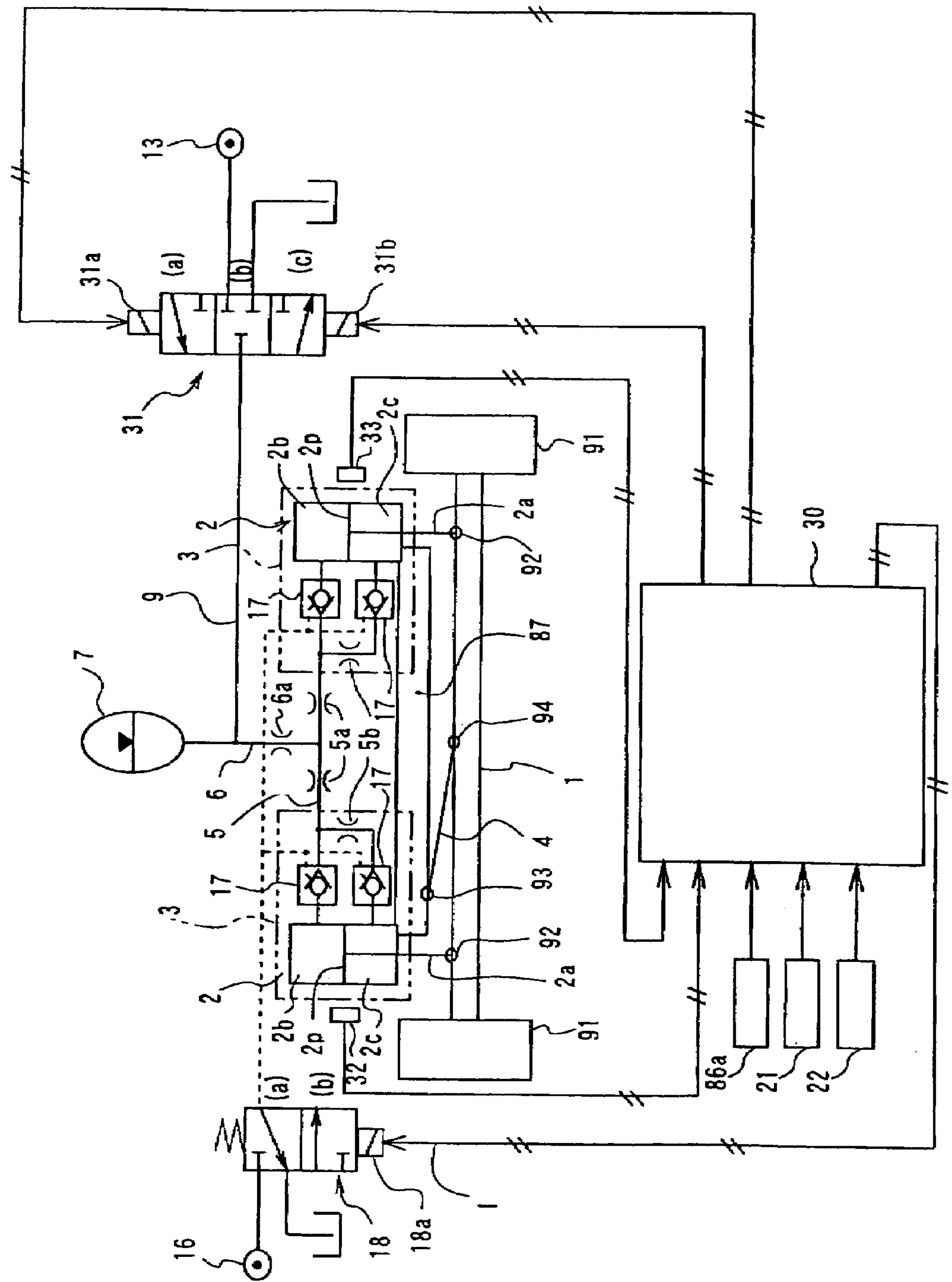
FIG. 18 is a hydraulic circuit diagram of the wheeled work vehicle achieved in the second embodiment of the present invention.
Figure 20:
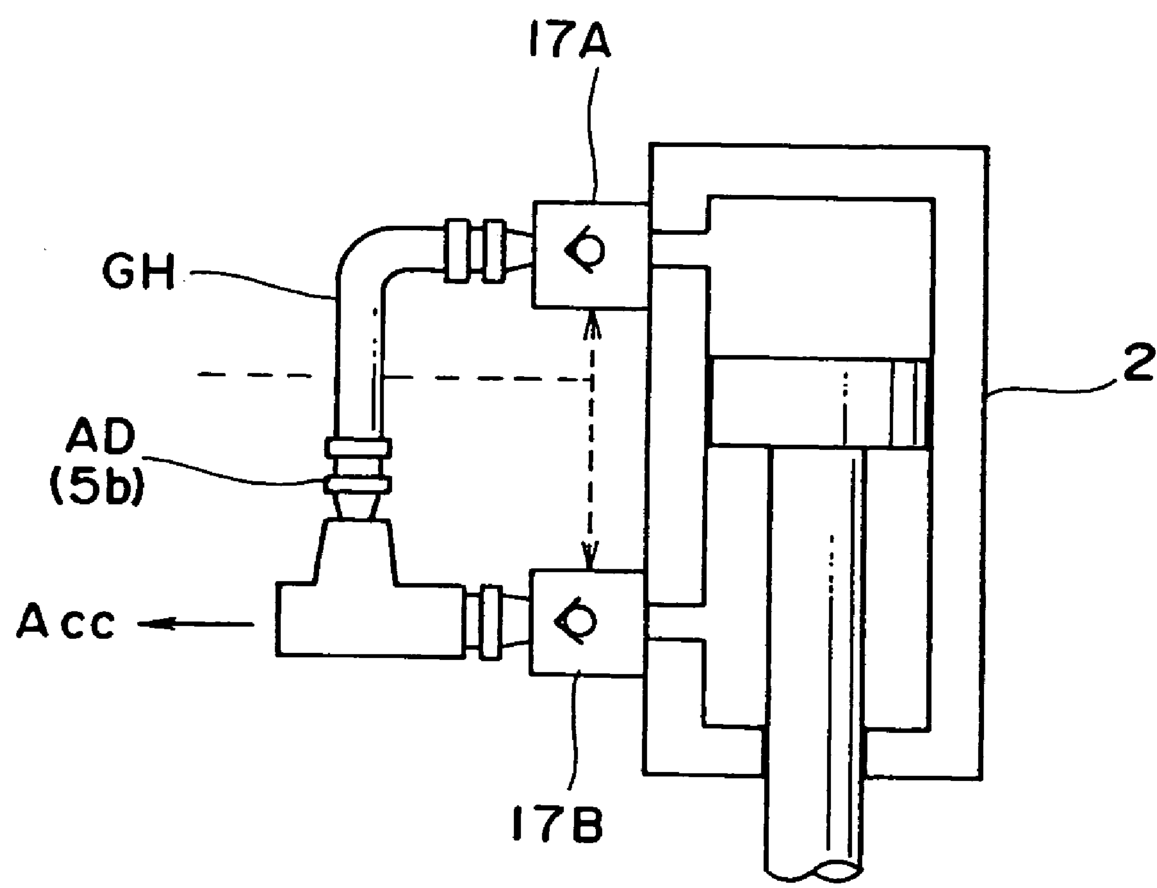
FIG. 20 presents another example of how the sectional size of the passage communicating between the bottom chamber and the rod chamber of a hydraulic cylinder constituting the hydraulic circuit of the wheeled work vehicle in the embodiment of the present invention may be varied.

FIG. 18 is a hydraulic circuit diagram illustrating the structure of the leveling device achieved in the second embodiment of the present invention. It is to be noted that the same reference numerals are assigned to components identical to those shown in FIG. 11 and the following explanation mainly focuses on the differences from FIG. 11. As shown in FIG. 18, the leveling device in the second embodiment is constituted by providing an solenoid control valve 31 that controls the flow of the pressure oil from the main hydraulic source 13 to the individual hydraulic cylinders 2, a controller 30 that controls the drive of the solenoid control valve 31, stroke sensors 32 and 33 that detect the stroke distances z1 and z2 of the hydraulic cylinders 2 from a reference position z0 (corresponds to the state shown in FIG. 16A in the embodiment) and a gate lock switch 86*a* that is turned on/off in response to a release/lock operation of the gate lock lever 86, in place of the directional control valve 8, the hydraulic pilot controlled directional control valve 12, the lock valve 15 and the solenoid controlled directional control valve 14 in FIG. 11 and the relay circuit in FIG. 14. It is to be noted that although not shown, the solenoid 27 for parking brake release and the solenoid 28 for working brake activation are connected to the brake switch 21, as illustrated in FIG. 11.

The stroke sensors 32 and 33, the gate lock switch 86*a*, the brake switch 21 and the leveling switch 22 are connected to the controller 30. The controller 30 executes the processing described below based upon the signals input from them and outputs a control signal I to solenoids 31*a* and 31*b* of the solenoid control valve 31 and the solenoid 18*a* of the solenoid controlled directional control valve 18.

FIG. 19 is a flowchart of an example of the processing executed by the controller 30. The processing in this flowchart is started by, for instance, turning on the engine key switch (not shown). First, a decision is made in step S1 as to which position the brake switch 21 has been switched to based upon the signal provided from the brake switch 21. If it is decided that the brake switch 21 has been switched to the P contact point 21P, the operation proceeds to step S2 to make a decision as to whether or not the leveling switch 22 has been turned on. If an affirmative decision is made in step S2, the operation proceeds to step S3, whereas if a negative decision is made, the operation proceeds to step S13. In step S3, a decision is made as to whether or not the gate lock switch 86*a* has been turned on, i.e. whether or not a lock operation has been performed at the gate lock lever 86. If an affirmative decision is made in step S3, the operation proceeds to step S4, whereas if a negative decision is made, the operation proceeds to step S11. In step S4, the control signal I is output to the solenoid 18*a* of the solenoid controlled directional control valve 18 to excite the solenoid 18*a*. In response, the solenoid controlled directional control valve 18 is switched to position (b) as shown in FIG. 18, and the pressure oil from the pilot hydraulic source 16 is supplied to the pilot ports of the pilot check valves 17 to enable the pilot check valves 17 to function as release valves.

Next, the detection values z1 and z2 obtained at the stroke sensors 32 and 33 are read in step S5. In step S6, the average ((z1+z2)/2) of the detection values z1 and z2 is ascertained and then the deviation "a" (=za−(z1 and z2 )/2) is calculated by subtracting the average from a predetermined target value Za (e.g., 0, which represents the state in which L1=L2). Next, a decision is made instep S7 as to whether or not the deviation "a" is larger than a predetermined upper limit value al (e.g., 1.01×a), and the operation proceeds to step S8 if an affirmative decision is made, whereas the operation proceeds to step S9 if a negative decision is made. In step S8, the control signal I is output to the solenoid 31*a* of the solenoid control valve 31 to excite the solenoid 31*a* and then the operation returns to step S5. Thus, the solenoid control valve 31 is switched to position (a), allowing the pressure oil from the main hydraulic source 13 to be supplied to the oil chambers 2*b* and 2*c* of the hydraulic cylinders 2. As a result, the hydraulic cylinders 2 expand to raise the vehicle height. In step S9, a decision is made as to whether or not the deviation "a" is smaller than a predetermined lower limit value a2 (e.g., 0.99×a), and the operation proceeds to step S10 if an affirmative decision is made, whereas the operation proceeds to step S11 if a negative decision is made. In step S10, the control signal I is output to the solenoid 31*b* of the solenoid control valve 31 to excite the solenoid 31*b*, and then the operation returns to step S5. As a result, the solenoid control valve 31 is switched to position (c), allowing the pressure oil from the hydraulic cylinders 2 to be discharged into the tank. This causes the hydraulic cylinders to contract, which, in turn, lowers the vehicle height. In step S11, the output of the control signal I to the solenoids 31*a* and 31*b* of the solenoid control valve 31 is stopped to demagnetize the solenoids 31*a* and 31*b*, before the operation makes a return. Consequently, the electromagnetic control valve 31 is switched to position (b), which cuts off the circuit on the side of the hydraulic cylinders 2 from the main hydraulic source 13 and the tank.

If it is decided in step S1 that the brake switch 21 has been switched to the T contact point 21T, the operation proceeds to step S12, in which the control signal I is output to the solenoid 18*a* of the solenoid controlled directional control valve 18 to excite the solenoid 18*a* before proceeding to step S11. As a result, the solenoid controlled directional control valve 18 is switched to position (b) to allow the pressure oil from the pilot hydraulic source 16 to be supplied to the pilot ports of the pilot check valves 17 so that the pilot check valves 17 function as release valves. Thus, the oil chambers 2*b* and 2*c* of the hydraulic cylinders 2 become communicated with the accumulator 7, thereby effecting the suspension function (a suspension unlocked state) to absorb and damp the vibration occurring while the vehicle travels. If it is decided in step S1 that the brake switch 21 has been switched to the W contact point 21W, the operation proceeds to step S13 in which the output of the control signal I to the solenoid 18*a* of the solenoid controlled directional control valve 18 is stopped to demagnetize the solenoid 18*a* before proceeding to step S11. In response, the solenoid controlled directional control valve 18 is switched to position (a) to stop the supply of the pressure oil to the pilot ports of the pilot check valves 17, thereby allowing the pilot check valves 17 to function as check valves. As a result, the inflow/outflow of the pressure oil to/from the oil chambers 2*b* and 2*c* of the hydraulic cylinders 2 is prohibited (a suspension locked state), in order to resist the excavating reactive force and the like.

It is to be noted that since specific features of the basic operation achieved in the second embodiment are identical to those in the first embodiment, including the suspension function effected by the accumulator 7 in the travelling mode, a leveling operation enabled when the parking brake is engaged and a lock operation is performed at the gate lock lever 86 in the parking mode and the oil chambers 2*b* and 2*c* of the hydraulic cylinders 2 cut off in the working mode, a detailed explanation of these features is omitted.

In the second embodiment, in which the vehicle height is automatically adjusted by switching the solenoid control valve 31 in response to a command from the controller 30 based upon the detection values z1 and z2 provided by the stroke sensors 32 and 33 as described above, the directional control valve 8 does not need to be operated manually, to achieve a simpler operational procedure, thereby improving the efficiency of the leveling operation.

Figure 22:
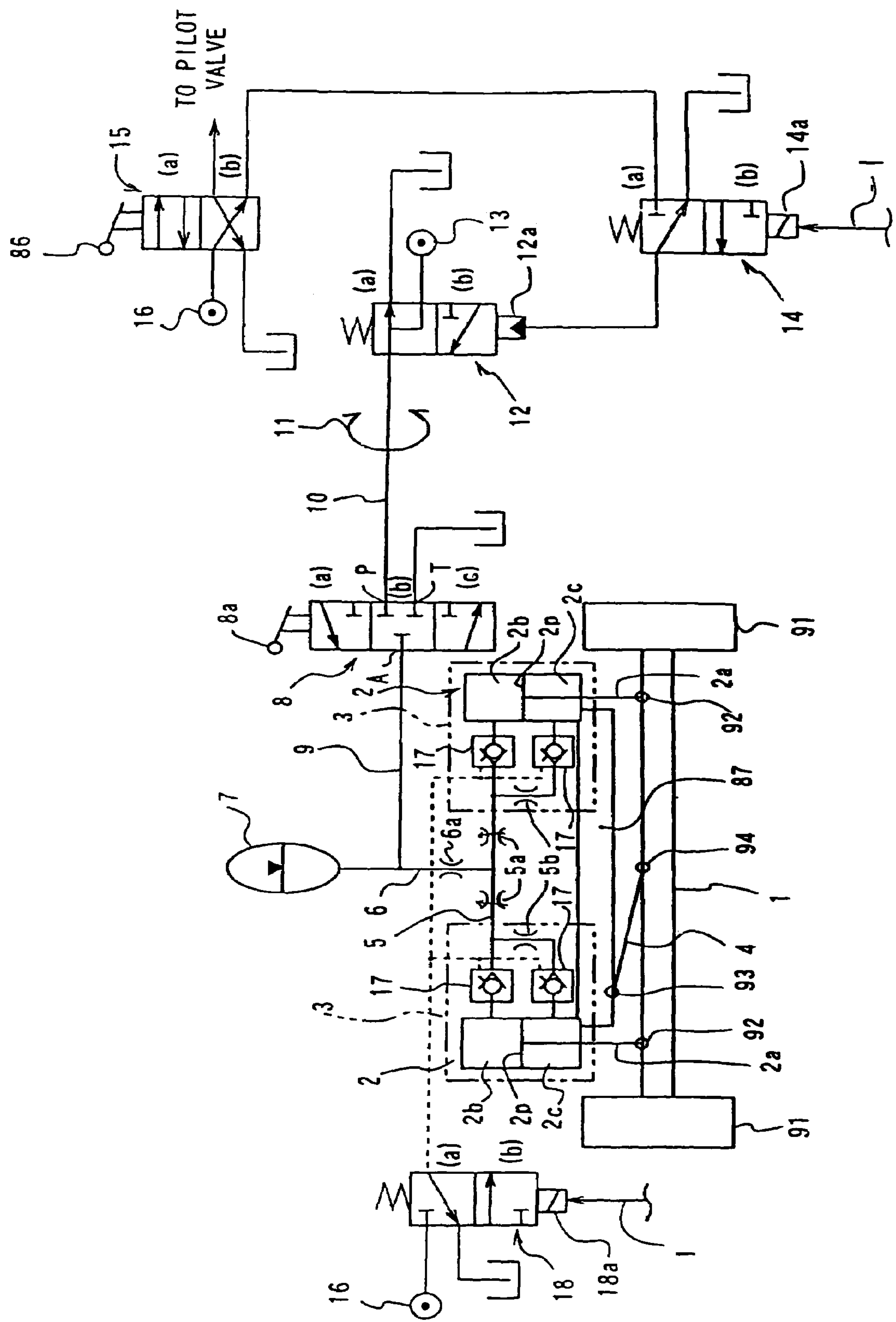
FIG. 22 is another example of a hydraulic circuit diagram of the wheeled work vehicle of the present invention.

In the explanation given above, a block IB having the variable restrictor VD provided at the passage C1 between the head chamber 2*b* and the rod chamber 2*c* is provided in conjunction with each suspension hydraulic cylinder 2, to adjust the suspension performance. As an alternative, the pilot check valves 17A and 17B provided in conjunction with each hydraulic cylinder 2 may be made to communicate with each other via a rubber hose GH with a restrictor 5*b* provided at a connection adaptor AD provided to connect the rubber hose GH to enable suspension performance adjustment by replacing the adapter with any of the various adapters with different internal diameters. The suspension performance and, in particular, the firmness can also be adjusted with ease by constituting the restrictor 5*a* provided between the head chamber 2*b* of each suspension hydraulic cylinder 2 and the accumulator 7 with a variable restrictor, as shown in FIG. 22. The alternative described earlier may also be adopted in this structure, by connecting the head chamber 2*b* of the suspension hydraulic cylinder 2 and the accumulator 7 with a rubber hose, providing the restrictor 5*a* at the connection adapter and replacing the adapter with any of various adapters with different internal diameters to achieve suspension performance adjustment. While the restrictor 5*b* is a variable restrictor in the embodiment, the restrictor 5*b* may be a fixed restrictor and the restrictor 5*a*, instead, may be constituted as a variable restrictor. Alternatively, by constituting both the restrictor 5*b* and the restrictor 5*a* as variable restrictors, the damping performance and the firmness can both be adjusted with ease.

In addition, while the entire accumulator 7 is housed within the space formed by the upper plate 77 and the side plates 75 and 76 of the frame 70 in the explanation given above, the accumulator 7 does not need to be housed inside the space in its entirety, since it will be protected from falling objects and the like as long as most of the accumulator 7 is housed inside. While the accumulator 7 is horizontally installed inside the frame 70, it may be vertically installed or diagonally installed instead.

In the embodiments explained above, the directional control valve function which allows the hydraulic cylinders 2 provided for leveling and suspension to be connected to the hydraulic pump 13 or the tank and the stop valve function which minimizes the leak by cutting off the hydraulic cylinders 2 from the hydraulic pump 13 and the tank are realized in a single ball-type three-position directional control valve 8. However, if a spool-type three-position directional control valve such as that disclosed in Japanese Laid-Open Patent Publication No. H 7-132723 is employed to minimize fluctuations in the vehicle height by preventing the leak at the hydraulic cylinders for leveling and suspension with a high degree of reliability, a stop valve achieving a structure that minimizes the leak may be provided in series to the spool-type three-position directional control valve. The spool-type three-position directional control valve disclosed in Japanese Laid-Open Patent Publication H7-132723 is provided between a line connecting an accumulator with a hydraulic cylinder and a hydraulic source. The spool-type three-position directional control valve is driven according to a clearance between a vehicle body and-an axle, which is detected by a distance meter, to supply/discharge pressure oil from the hydraulic source to/from the hydraulic cylinder. In this manner, the distance between the vehicle body and the axle is set to a specified value to keep the work vehicle level. Such a stop valve may be the ball-type switching valve shown in FIG. 12, a pilot type check valve that functions as a release valve or a check valve in correspondence to the level of the pressure applied to the pilot port, or the like.

Figure 21A:
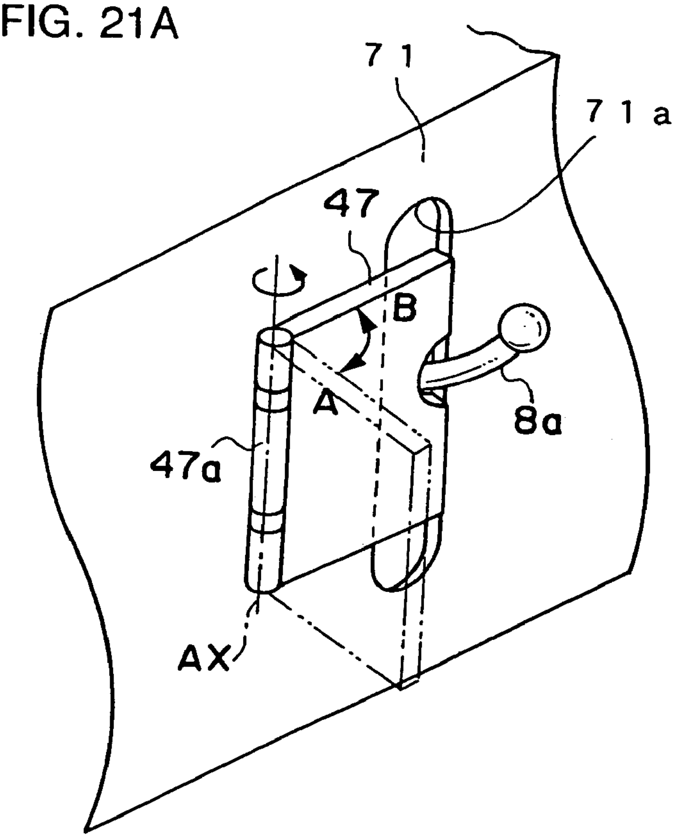
FIGS. 21A and 21B show other methods that may be adopted to retain the position of the leveling switching lever in the wheeled work vehicle achieved in the embodiment of the present invention.
Figure 21B:
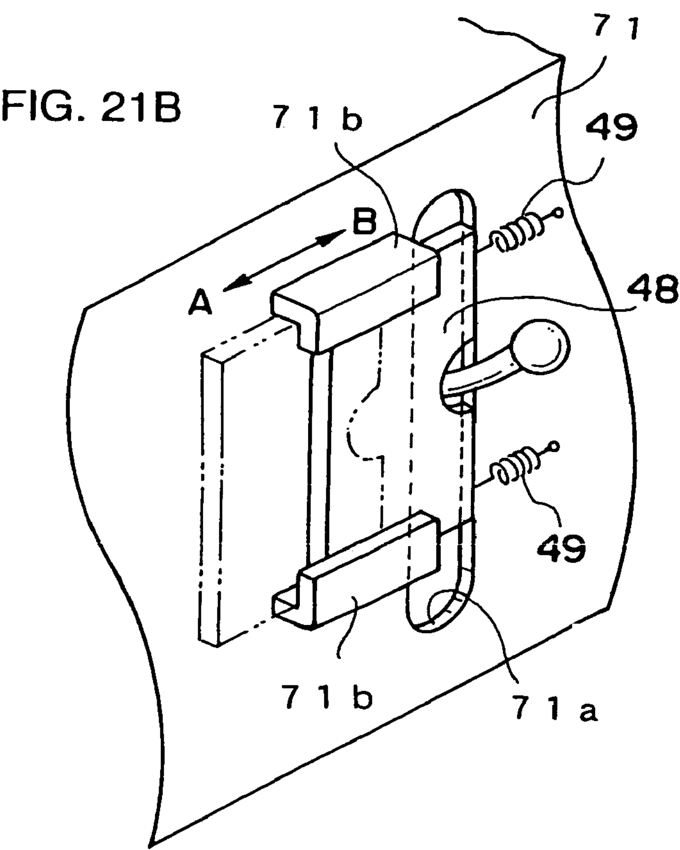

In addition, while the position of the switching lever 8*a* is restricted by securing the retaining cover 45 with the wing nuts 46 in the embodiments described above, the switching lever 8*a* may be retained at a specific position through another method. FIGS. 21A and 21B present examples of methods that may be adopted for this purpose. In the method shown in FIG. 21A, a hinged plate 47 capable of swinging along the direction indicated by the arrow AB around a rotational axis AX constituting the support point is provided, and a spring (not shown) is mounted inside a rotating member 47*a*. This spring applies a force to the hinged plate 47 along direction B, thereby restricting the position of the switching lever 8*a*. In the method shown in FIG. 21B a pair of arched guides 71*b* are secured at the side plate 71, a thin plate 48 capable of sliding along the direction indicated by the arrow AB are inserted inside the guides 71*b* and the thin plate 48 and the side-plate 71 are linked with springs 49. These springs 49 apply a force to the plate 48 along direction B, thereby restricting the position of the switching lever 8*a*.

Figure 23:
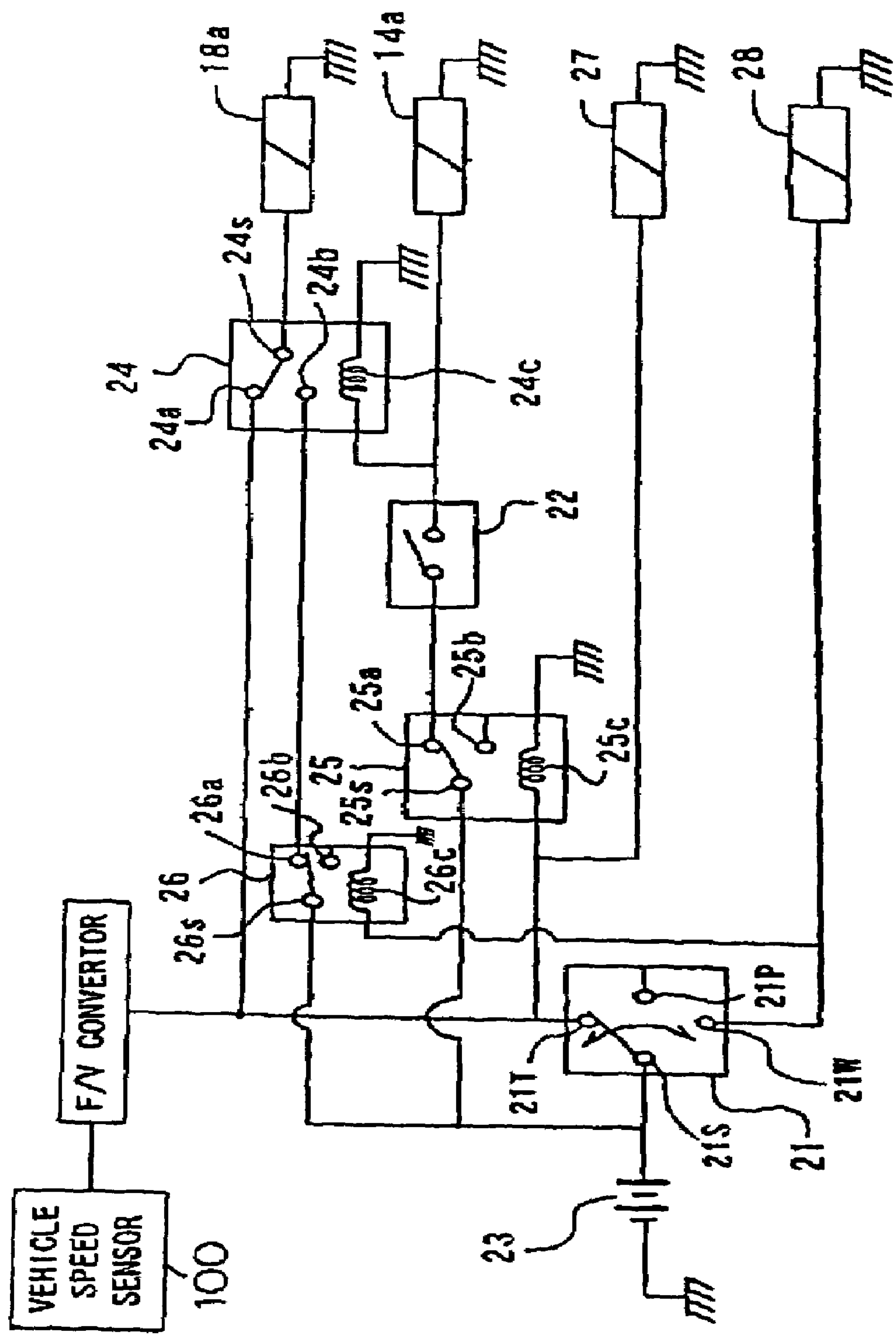
FIG. 23 is another example of an electric circuit diagram of the wheeled work vehicle of the present invention.

While the projections 73*b* are provided at specific positions (positions corresponding to the position of the nipple 94*a*) at the front plate 73 of the frame 70 to facilitate a leveling operation, a mark other than such projections (e.g., scribing) may be provided. In addition, while the accumulator 7 communicates with the right and left hydraulic cylinders 2, separate accumulators 7 may be provided for the individual hydraulic cylinders 2. While the leveling device is provided only in conjunction with the front wheels in the embodiment described above, the leveling device may be provided only in conjunction with the rear wheels or in conjunction with both the front wheels and the rear wheels. Moreover, while the state of the vehicle, i.e., the travelling state, the park state or the working state, is detected in response to an operation of the brake switch 21, i.e., in correspondence to the braking state, in the embodiments described above, the state of the vehicle may instead be detected based upon a detection value provided by a vehicle speed sensor 100 (FIG. 23) or the like.

INDUSTRIAL APPLICABILITY

While an explanation is given above on an example in which the present invention is adopted in a wheeled hydraulic excavator, the present invention may be likewise adopted in other types of wheeled work vehicles.

What is claimed is:

1. A suspension system for a wheeled work vehicle, comprising:

a pair of hydraulic cylinders mounted at a chassis and a left side and a right side of at least one axle that is provided at one of a front and a rear of the vehicle;

a first passage provided for each of the hydraulic cylinders, that communicates between a head chamber and a rod chamber at each of the hydraulic cylinders and allows oil to flow from one of the head chamber and the rod chamber to the other;

a second passage that communicates the first passages to each other; and a single accumulator that communicates with the second passage via a first restrictor; wherein the hydraulic cylinders and the accumulator perform a suspension function during traveling; and a second restrictor provided at the second passage between the first restrictor and each of the first passages.

2. A suspension system for a wheeled work vehicle according to claim 1, further comprising:

a hydraulic source for vehicle height adjustment from which pressure oil supplied to the hydraulic cylinders originates; and a leveling valve that allows the pressure oil from the hydraulic source for vehicle height adjustment to be supplied to the hydraulic cylinders to raise a vehicle height, and allows the pressure oil to be discharged from the hydraulic cylinders to lower the vehicle height.

3. A suspension system for a wheeled work vehicle according to claim 1, wherein an area of the first restrictor is greater than an area of each of the second restrictors.

4. A suspension system for a wheeled work vehicle according to claim 1, further comprising:

a third restrictor provided at each of the first passages between the rod chamber of each of the hydraulic cylinders and one of the second restrictors.

5. A suspension system for a wheeled work vehicle according to claim 1, further comprising:

a pilot check valve provided at each of the first passages, that allows/prevents oil flow from the head chamber and the rod chamber of each of the hydraulic cylinders.

6. A suspension system for a wheeled work vehicle according to claim 1, wherein the hydraulic cylinders are each provided at a right side and a left side of the chassis and the chassis and the axle are connected to each other via a link so as to restrict a movement of the chassis in a left-and-right direction.

7. A suspension system for a wheeled work vehicle according to claim 6, wherein:

a mounting structure is formed in such a manner that the hydraulic cylinders are connected rotatably in a left-and-right direction to the chassis and the axle, and the chassis and the axle are connected to a left side and a right side of the link respectively via a pin extending in a forward/backward direction and are in contact with a front side and a rear side of the link, and at least a mounting tolerance of the link along a forward/backward direction of the vehicle with regard to the chassis and the axle is smaller than a mounting tolerance of the hydraulic cylinders along the forward/backward direction of the vehicle with regard to the chassis and the axle.

8. A vehicle height adjustment system for a wheeled work vehicle, comprising:

a hydraulic source;

a pair of hydraulic cylinders mounted at a chassis and a left side and a right side of at least one axle that is provided at one of a front and a rear of the vehicle and, that adjusts a distance between the axle and the chassis by using pressure oil from the hydraulic source;

a traveling-state detection device that detects whether the vehicle is in a traveling state or a non-traveling state;

a working-state detection device that detects whether the vehicle is in a working state or a non-working state; and a control device that allows the pressure oil from the hydraulic source to be supplied to the hydraulic cylinders when the traveling-state detection device detects the non-traveling state and the working-state detection device detects the non-working state.

9. A vehicle height adjustment system for a wheeled work vehicle according to claim 8, wherein:

the control device comprises (a) a first directional control valve provided at a line for supplying the pressure oil from the hydraulic source to the hydraulic cylinders, that controls flow of the pressure oil from the hydraulic source to the hydraulic cylinders, (b) a second directional control valve that is switched in accordance with the traveling state or non-traveling state of the vehicle, and (c) a third directional control valve that is switched in accordance with the working state or non-working state of the vehicle, and the first directional control valve is switched in response to a changeover of the second directional control valve and the third directional control valve.

10. A vehicle height adjustment system for a wheeled work vehicle according to claim 8, further comprising:

a check valve that communicates oil chambers of the hydraulic cylinders with an accumulator via a restrictor to achieve a suspension function and cuts communication between the oil chambers and the hydraulic cylinders to lock the suspension function; and a changeover device that switches the check valve to achieve the suspension function when the traveling-state detection device detects the traveling state.

11. A vehicle height adjustment system for a wheeled work vehicle according to claim 8, further comprising:

a leveling unit that expands/contracts the hydraulic cylinders by supplying/discharging the pressure oil to/from the hydraulic cylinders to adjust a vehicle height in response to operation by a user, wherein the control device (a) allows the leveling unit to adjust the vehicle height when the traveling-state detection device detects the non-traveling state and the working-state detection device detects the non-working state, and (b)

prohibits the leveling unit from adjusting the vehicle height and communicates oil chambers of the hydraulic cylinders with an accumulator via a restrictor to achieve a suspension function when the traveling-state detection device detects the traveling state.

12. A vehicle height adjustment system for a wheeled work vehicle according to claim 11, further comprising:

a suspension lock device that prohibits expansion/contraction of the hydraulic cylinders effected by the leveling unit to lock the suspension function when the traveling-state detection device detects the non-traveling state.

13. A wheeled excavator, comprising:

a suspension system; and a vehicle height adjustment system, wherein:

the suspension system comprises a hydraulic circuit including (a) a pair of hydraulic cylinders mounted at a chassis and a left side and a right side of at least one axle that is provided at one of a front and a rear of a vehicle, (b) a first passage provided for each of the hydraulic cylinders, that communicates between a head chamber and a rod chamber at each of the hydraulic cylinders and allows oil to flow from one of the head chamber and the rod chamber to the other, (c) a second passage that communicates the first passages to each other, and (d) a single accumulator that communicates with the second passage via a first restrictor;

the hydraulic cylinders and the accumulator perform a suspension function during traveling;

the hydraulic cylinders are each provided at a right side and a left side of the chassis and the chassis and the axle are connected to each other via a link so as to restrict a movement of the chassis in a left-and-right direction; and the vehicle height adjustment system comprises (e) a hydraulic source from which pressure oil supplied to the hydraulic circuit of the suspension system originates, and (f) a leveling unit that raises a vehicle height by supplying the pressure oil from the hydraulic source to the hydraulic circuit and lowers the vehicle height by discharging the pressure oil from the hydraulic circuit in response to operation by a user and functions as a stop valve to reduce oil leaks from the hydraulic circuit while not being operated by a user, with the stop valve having a function of blocking between the hydraulic circuit of the suspension system and a hydraulic circuit of the vehicle height adjustment system.

14. A wheeled excavator, comprising:

a suspension system; and a vehicle height adjustment system, wherein the suspension system comprises a hydraulic circuit including (a) a pair of hydraulic cylinders mounted at a chassis and a left side and a right side of at least one axle that is provided at one of a front and a rear of a vehicle, (b) a first passage provided for each of the hydraulic cylinders, that communicates between a head chamber and a rod chamber at each of the hydraulic cylinders and allows oil to flow from one of the head chamber and the rod chamber to the other, (c) a second passage that communicates the first passages to each other, and (d) a single accumulator that communicates with the second passage via a first restrictor;

the hydraulic cylinders and the accumulator perform a suspension function during traveling;

the hydraulic cylinders are each provided at a right side and a left side of the chassis and the chassis and the axle are connected to each other via a link so as to restrict a movement of the chassis in a left and right direction;

the vehicle height adjustment system comprises (e) a hydraulic source from which pressure oil supplied to the hydraulic circuit of the suspension system originates, and (f) a leveling unit that raises a vehicle height by supplying the pressure oil from the hydraulic source to the hydraulic circuit and lowers the vehicle height by discharging the pressure oil from the hydraulic circuit in response to operation by a user and functions as a stop valve to reduce oil leaks from the hydraulic circuit while not being operated by a user; and the wheel excavator further comprises a second restrictor provided at the second passage between the first restrictor and each of the first passages.

15. A wheeled excavator according to claim 14, wherein an area of the first restrictor is greater than an area of each of the second restrictors.

16. A wheeled excavator according to claim 14, further comprising:

a third restrictor provided at each of the first passages between the rod chamber of each of the hydraulic cylinders and one of the second restrictors.

17. A wheeled excavator, comprising:

a suspension system; and a vehicle height adjustment system, wherein the suspension system comprises a hydraulic circuit including (a) a pair of hydraulic cylinders mounted at a chassis and a left side and a right side of at least one axle that is provided at one of a front and a rear of a vehicle, (b) a first passage provided for each of the hydraulic cylinders, that communicates between a head chamber and a rod chamber at each of the hydraulic cylinders and allows oil to flow from one of the head chamber and the rod chamber to the other, (c) a second passage that communicates the first passages to each other, and (d) a single accumulator that communicates with the second passage via a first restrictor;

the hydraulic cylinders and the accumulator perform a suspension function during traveling;

the hydraulic cylinders are each provided at a right side and a left side of the chassis and the chassis and the axle are connected to each other via a link so as to restrict a movement of the chassis in a left and right direction;

the vehicle height adjustment system comprises (e) a hydraulic source from which pressure oil supplied to the hydraulic circuit of the suspension system originates, and (f) a leveling unit that raises a vehicle height by supplying the pressure oil from the hydraulic source to the hydraulic circuit and lowers the vehicle height by discharging the pressure oil from the hydraulic circuit in response to operation by a user and functions as a stop valve to reduce oil leaks from the hydraulic circuit while not being operated by a user; and the wheeled excavator further comprises a pilot check valve provided at each of the first passages, that allows/prevents oil flow from the head chamber and the rod chamber of each of the hydraulic cylinders.

* * * * *